(12) United States Patent
Gyoda

(10) Patent No.: US 9,897,788 B2
(45) Date of Patent: Feb. 20, 2018

(54) OPTICAL SYSTEM, IMAGE PICKUP APPARATUS, AND OPTICAL DEVICE

(71) Applicant: CANON KABUSHIKI KAISHA, Tokyo (JP)

(72) Inventor: Yuichi Gyoda, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/881,598

(22) Filed: Oct. 13, 2015

(65) Prior Publication Data

US 2016/0116734 A1 Apr. 28, 2016

(30) Foreign Application Priority Data

Oct. 22, 2014 (JP) .................................. 2014-215363

(51) Int. Cl.
| | | |
|---|---|---|
| *G02B 15/14* | (2006.01) | |
| *G02B 15/16* | (2006.01) | |
| *G02B 15/177* | (2006.01) | |
| *G02B 27/00* | (2006.01) | |
| *G02B 15/163* | (2006.01) | |
| *G02B 15/20* | (2006.01) | |

(52) U.S. Cl.
CPC ....... *G02B 15/177* (2013.01); *G02B 27/0025* (2013.01); *G02B 15/16* (2013.01); *G02B 15/161* (2013.01); *G02B 15/163* (2013.01); *G02B 15/20* (2013.01)

(58) Field of Classification Search
CPC .. G02B 15/161; G02B 15/163; G02B 15/177; G02B 15/20; G02B 27/0025; G02B 27/0068

USPC .................. 359/680–684, 691, 693, 694, 695
See application file for complete search history.

(56) References Cited

U.S. PATENT DOCUMENTS

| | | | | |
|---|---|---|---|---|
| 4,198,127 A | * | 4/1980 | Itoh ...................... | G02B 15/177 359/680 |
| 5,136,431 A | * | 8/1992 | Terasawa ............... | G02B 15/17 359/684 |
| 6,084,721 A | * | 7/2000 | Terasawa ............. | G02B 15/173 359/684 |

(Continued)

FOREIGN PATENT DOCUMENTS

| | | |
|---|---|---|
| JP | H08163426 A | 6/1996 |
| JP | 2008-134323 A | 6/2008 |

(Continued)

*Primary Examiner* — Joseph P Martinez
*Assistant Examiner* — Nicholas R Pasko
(74) *Attorney, Agent, or Firm* — Carter, Deluca, Farrell & Schmidt, LLP

(57) ABSTRACT

An optical system includes an aperture stop, a unit A configured to move during a distortion adjustment, and a unit B disposed at an image side relative to the unit A and configured to move with a locus different from a locus of the unit A during the distortion adjustment, the optical system changes from a first optical state having a first distortion to a second optical state having a second distortion larger than the first distortion, and focal lengths of the units A and B, moving amounts of the units A and B during a change from the first to second optical states, distances from the aperture stop to the units A and B, distances from a lens surface of the unit A closest to the object side to an image plane, and a total optical length of the optical system satisfy a predetermined condition.

12 Claims, 15 Drawing Sheets

(56) References Cited

U.S. PATENT DOCUMENTS

| | | | | |
|---|---|---|---|---|
| 7,268,955 B2* | 9/2007 | Ogata | .................. | G02B 15/173 |
| | | | | 359/686 |
| 7,773,311 B2* | 8/2010 | Endo | .................... | G02B 15/177 |
| | | | | 359/682 |
| 8,149,519 B2* | 4/2012 | Yamanashi | .......... | G02B 15/173 |
| | | | | 359/684 |
| 8,199,243 B2* | 6/2012 | Miyazaki | ............... | G03B 13/00 |
| | | | | 348/207.99 |
| 9,239,451 B2* | 1/2016 | Aoi | ........................ | G02B 13/18 |
| 2012/0229913 A1* | 9/2012 | Hara | .................... | G02B 15/173 |
| | | | | 359/683 |
| 2014/0085531 A1* | 3/2014 | Yamano | ............... | G02B 15/173 |
| | | | | 348/347 |

FOREIGN PATENT DOCUMENTS

| | | | | |
|---|---|---|---|---|
| JP | 2014-010286 A | 1/2014 | | |
| WO | WO 2013186999 A1 * | 12/2013 | ........... | G02B 15/173 |

\* cited by examiner

OPTICAL SYSTEM, IMAGE PICKUP APPARATUS, AND OPTICAL DEVICE

BACKGROUND OF THE INVENTION

Field of the Invention

The present invention relates to an optical system suitable for a photographic camera, a digital still camera, a digital video camera, or the like.

Description of the Related Art

Recently, an image pickup optical system with a wide angle of view and a high quality (i.e., high resolving power and low distortion) has been required. In many cases, a wide-angle lens with a wide angle of view disposes a lens unit having a negative refractive power as a first unit. However, if the lens unit having the negative refractive power is disposed as the first unit, typically, negative distortion (barrel-shaped distortion) tends to occur. Japanese Patent Laid-open No. 2014-10286 discloses a zoom lens which uses an aspherical lens as a surface closest to an object side to suppress an absolute value of distortion while it is an extremely-wide angle zoom lens in which an angle of view at a wide-angle end is greater than or equal to 100 degrees.

However, even in a lens with little distortion, a captured image may look distorted due to the emphasis of perspective. In addition, appropriate distortion changes depending on an object and a composition of the captured image. Accordingly, the distortion needs to be variable.

Japanese Patent Laid-open No. H8-163426 discloses a method of performing an electric correction in an optical device (camera) to change the distortion. In the method of Japanese Patent Laid-open No. H8-163426, however, a current image is processed at the time of the correction, and accordingly the image is deteriorated. For example, when an image pickup optical system is attached to the camera having an optical finder, it is not possible to perform appropriate framing since the distortion correction cannot be confirmed through the optical finder.

Japanese Patent Laid-open No. 2008-134323 discloses an image pickup optical system which can optically vary the distortion to correct the emphasis of perspective while maintaining an image quality. According to the configuration of Japanese Patent Laid-open No. 2008-134323, a lens unit in the image pickup optical system can be moved in an optical axis direction to change the distortion.

In the configuration of Japanese Patent Laid-open No. 2008-134323, only a single lens unit in the image pickup optical system is moved, and accordingly an amount of change of the distortion is small. Furthermore, in the configuration of Japanese Patent Laid-open No. 2008-134323, the image quality is deteriorated if a sufficient amount of change of the distortion is to be obtained. Accordingly, it is difficult to vary the distortion while maintaining a good image quality.

SUMMARY OF THE INVENTION

The present invention provides an optical system, an image pickup apparatus, and an optical device which are capable of optically changing distortion while maintaining a good image quality.

An optical system as one aspect of the present invention includes an aperture stop, a unit A configured to move during a distortion adjustment, and a unit B disposed at an image side relative to the unit A and configured to move with a locus different from a locus of the unit A during the distortion adjustment, the optical system changes from a first optical state having a first distortion to a second optical state having a second distortion larger than the first distortion during the distortion adjustment, and focal lengths of the unit A and the unit B, moving amounts of the unit A and the unit B during a change from the first optical state to the second optical state, distances on an optical axis from the aperture stop to the unit A and the unit B, distances on the optical axis from a lens surface of the unit A closest to the object side to an image plane, and a total optical length of the optical system satisfy a predetermined condition.

An image pickup apparatus as another aspect of the present invention includes the optical system and a photoelectric conversion element configured to receive an optical image formed via the optical system.

An optical device as another aspect of the present invention includes an optical system including an aperture stop, a unit A configured to move during a distortion adjustment, and a unit B disposed at an image side relative to the unit A and configured to move with a locus different from a locus of the unit A during the distortion adjustment, and a distortion adjuster configured to perform the distortion adjustment, the unit A and the unit B move in an optical axis direction with the loci different from each other in response to operation of the distortion adjuster, and the optical system changes from a first optical state having a first distortion to a second optical state having a second distortion larger than the first distortion according to movements of the unit A and the unit B.

An image pickup apparatus as another aspect of the present invention includes the optical device and a photoelectric conversion element configured to receive an optical image formed via the optical system.

Further features and aspects of the present invention will become apparent from the following description of exemplary embodiments with reference to the attached drawings.

DESCRIPTION OF THE EMBODIMENTS

Figure 1A:
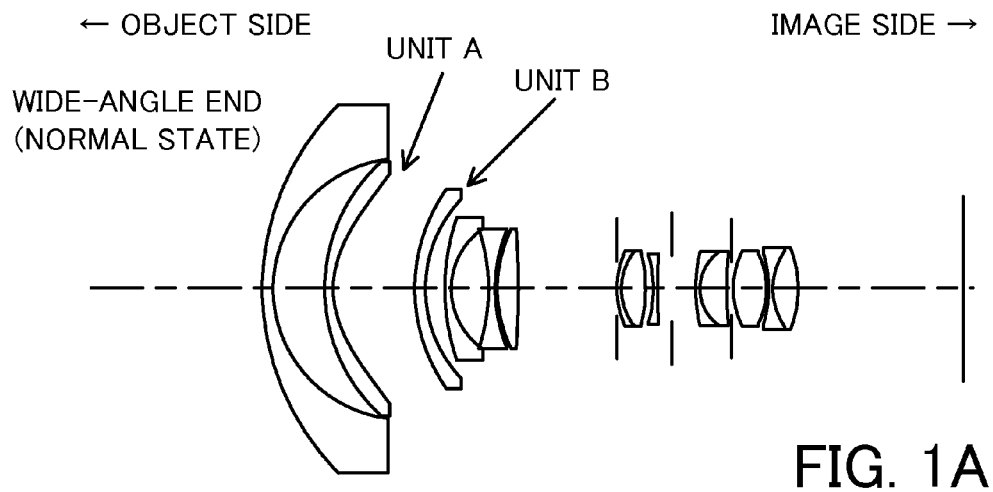
FIGS. 1A to 1C are cross-sectional view of an optical system in Embodiment 1.

Exemplary embodiments of the present invention will be described below with reference to the accompanied drawings.

An optical system (image pickup optical system) of this embodiment includes a plurality of lens elements (a unit A and a unit B) which move during a distortion adjustment, and an apertures stop. The aperture stop can change its diameter (opening diameter) mechanically or electrically. The aperture stop is disposed so that a ray (peripheral light beam) of the highest image height in the optical system passes through a center position of an optical axis of the aperture stop. Accordingly, even when the diameter of the aperture stop is decreased, the peripheral light beam can pass through the inside of the opening diameter of the aperture stop and alight intensity distribution on an imaging plane can be adjusted.

The lens elements such as the unit A and the unit B integrally move during the distortion adjustment, and each of the lens elements only need to include at least one lens and it does not have to include a plurality of lenses. The distortion adjustment means an adjustment (control) for changing a distortion of the optical system.

A lens unit is a lens element which integrally moves during zooming, and it only needs to include at least one lens and it does not have to include a plurality of lenses.

The distortion can be changed by moving a single lens element, but at the same time, astigmatism such as field curvature also varies when the distortion is greatly changed. Accordingly, when a good image quality is to be obtained in a large-distortion state (i.e., in a state where an amount of the distortion is large), it is difficult to obtain a good image quality in a small-distortion state (i.e., in a state where the amount of the distortion is small). As a result, it is difficult to maintain an image quality in both states. According to this embodiment, a plurality of lens units in the optical system are moved, and thus variations of the astigmatism and the like can be reduced while the distortion is greatly changed.

The optical system in this embodiment moves a plurality of lens elements in a direction approximately parallel to an optical axis, and accordingly the distortion can be greatly changed while a good image quality is maintained. In this embodiment, a state in which (an absolute value of) the distortion is small (i.e., small-distortion state) is referred to as a normal state (first optical state), and a state in which (the absolute value of) the distortion is large (i.e., large-distortion state) is referred to as a distortion change state (second optical state). It is preferred that the normal state is set when an emphasis of a sense of perspective is not to be corrected to obtain a photo as it is, and the distortion change state is set when the emphasis of the sense of perspective is to be corrected. In this embodiment, two lens elements move during a change of the normal state to the distortion change state, but the embodiment is not limited thereto. Three or more lens elements moving during the distortion adjustment can be provided. According to movements of the two lens elements, variations of other aberrations can be reduced while the distortion is greatly changed, and similarly the same effect can be obtained by movements of the three or more lens elements.

In this embodiment, among a plurality of lens elements which move during the change from the normal state to the distortion change state, a lens unit closest to an object side is referred to as a unit A and a lens unit disposed at an image side relative to the unit A is referred to as a unit B. In this case, the optical system of this embodiment is designed to satisfy conditional expression (1) below.

$$(fA/|fA|) \times (XA/|XA|) \times (LA/|LA|) + (fB/|fB|) \times (XB/|XB|) \times (LB/|LB|) = 0 \quad (1)$$

In conditional expression (1), symbol fi denotes a focal length of a unit i (i=A or B), and symbol Xi denotes a moving amount of the unit i (i=A or B) which moves during the change from the normal state to the distortion change state. Symbol Li denotes a distance from the aperture stop to a lens surface of the unit i (i=A or B) closest to the object side in the first optical state.

In this embodiment, signs of the moving amount Xi and the distance Li are defined as follows. The moving amount Xi indicates a positive value when the unit moves to the image side during the change from the first optical state (first state) in which the distortion is small to the second optical state (second state) in which the distortion is large, and on the other hand, it indicates a negative value when the unit moves to the object side. The distance Li indicates a positive value when the lens surface is located at the image side relative to the aperture stop, and on the other hand, it indicates a negative value when the lens surface is located at the object side relative to the aperture stop.

Conditional expression (1) is a conditional expression which is to be satisfied to maintain a good image quality in the normal state and the distortion change state, and it defines combinations of signs of the focal lengths, the moving directions, and the direction from the aperture stop, with respect to the unit A and the unit B. Table 1 indicates examples of the combinations of the focal length fi, the moving amount Xi, and the distance Li. Embodiments 1 to 5 described below correspond to examples (A), (B), (C), (D), and (C) in Table 1, respectively.

TABLE 1

|     | fA | XA | LA | fB | XB | LB |
|-----|----|----|----|----|----|----|
| (A) | N  | P  | N  | N  | N  | N  |
| (B) | N  | P  | N  | P  | P  | N  |
| (C) | N  | P  | N  | P  | N  | P  |
| (D) | N  | P  | N  | N  | P  | P  |

P: POSITIVE
N: NEGATIVE

When the unit A moves so that a sign of fA×XA×LA as a first term of conditional expression (1) is positive while an object position (object) is constant (for example, approximately at an infinity position), a focus position (paraxial image-plane position) and a spherical aberration change to an over side compared to a state before the movement. Similarly, when the unit A moves so that the sign of fA×XA×LA is negative, the focus position and the spherical aberration change to an under side. This is true for the sign of fB×XB×LB as a second term in conditional expression (1).

In other words, a sum of the first term and the second term in conditional expression (1) is zero, and accordingly changes of the spherical aberration and the image-plane position during the transition from the normal state to the distortion change state can be canceled (compensated) each other by moving the unit A and the unit B to satisfy conditional expression (1). As a result, in both of the normal state and the distortion change state, a good image quality can be maintained. If the unit A and the unit B move so as not to satisfy conditional expression (1), it is difficult to maintain the good image quality in both of the normal state and the distortion change state because the spherical aberration and the image-plane position are greatly changed.

In addition, the optical system (image pickup optical system) of this embodiment is designed so that a distance AL from the apex of a surface of the unit A at the object side to the image plane in the first optical state and a total optical length TL satisfy conditional expression (2) below.

$$AL/TL>0.7 \qquad (2)$$

The total optical length TL is a distance from an object-side surface of a lens closest to the object side in the optical system to the image plane.

Conditional expression (2) is an expression for changing the distortion sufficiently. If a value exceeds the lower limit of conditional expression (2), (an absolute value of) a height of an off-axis light beam with respect to the optical axis is decreased. The distortion can be effectively corrected by a lens with an increase of the height of the off-axis light beam. Accordingly, it is difficult to change the distortion if the height of the off-axis light beam is decreased. As a result, when the distortion is to greatly change, it is necessary to increase the moving amount of the unit A or increase the power of the unit A, and accordingly the variations of the field curvature and a coma aberration increase during the change from the normal state to the distortion change state, and it is difficult to maintain the image quality.

Satisfying conditional expressions (1) and (2), an optical system can be provided which is capable of optically changing the distortion while maintaining the good image quality.

Subsequently, preferred conditions for the optical system in this embodiment will be described.

The optical system of this embodiment is designed so that a focal length and a distortion amount in each of the normal state and the distortion change state satisfy conditional expression (3) below.

$$-2.0<F/\Delta D<0.5 \qquad (3)$$

In conditional expression (3), $F=(f2-f1)\times 100/f2$, f1 is a focal length of an entire system of the optical system in the normal state, and f2 is a focal length of the entire system of the optical system in the distortion change state. Furthermore, $\Delta D=D2-D1$, D1 is a distortion amount [%] in the normal state, and D2 is the distortion amount [%] in the distortion change state. The distortion amount is a value (including a sign) of the distortion at an image height where an absolute value of the distortion is maximized. Conditional expression (3) is an expression for easily performing a framing in the distortion change amount while achieving a sufficient change of the distortion.

If (an absolute value of) $\Delta D$ as a change amount of the distortion from the normal state to the distortion change state is too small with respect to (an absolute value of) F as a change amount of the focal length from the normal state to the distortion change state, the absolute value of the denominator of conditional expression (3) is decreased with respect to the absolute value of the numerator of conditional expression (3). Accordingly, the value exceeds the upper limit or the lower limit of conditional expression (3).

Subsequently, a reason why the absolute value of the upper limit of conditional expression (3) is smaller than the absolute value of the lower limit will be described. This means that it is preferred that the focal length is approximately constant or increases positively when negative distortion is increased during the change from the normal state to the distortion change state. This is because an angle of view is abruptly increased during the change from the normal state to the distortion change state and it is difficult to perform an appropriate framing if the increases of the angle of view caused by the increase of the negative distortion and caused by the decrease of the focal length occur at the same time.

When the value exceeds the upper limit of conditional expression (3), it is difficult to achieve the sufficient change of the distortion, and accordingly it is not preferable. On the other hand, when the value exceeds the lower limit of conditional expression (3), the angle of view tends to greatly change during the change of the distortion. As a result, it is difficult for a user to perform an appropriate framing, and accordingly it is not preferable.

As described above, since the optical system is designed to satisfy conditional expression (3), the framing within a distortion change region can be easily performed while a sufficient change of the distortion is achieved.

It is preferred that the optical system of this embodiment satisfy conditional expression (4) below, where SA and SB are respectively image-plane position sensitivities of the unit A and the unit B in the optical system.

$$-2.0<(SA\times XA)/(SB\times XB)<-0.5 \qquad (4)$$

In conditional expression (4), $Si=(Si1+Si2)/2$ (i=A or B), Si1 (i=A or B) is an image-plane position sensitivity in the normal state, and Si2 (i=A or B) is an image-plane position sensitivity in the distortion change state. The image-plane position sensitivity means a moving distance of an image-plane position (imaging position) while a certain lens unit is moved by a minute unit distance.

Next, conditional expression (4) will be described. Symbols $SA\times XA$ and $SB\times XB$ in conditional expression (4) mean focus moving amounts caused by movements of the unit A and the unit B, respectively. Accordingly, the value of $-1.0$ for conditional expression (4) means that focus positions in the normal state and the distortion change state approximately coincide with each other. If the value of conditional expression (4) is close to $-1.0$ although it is not $-1.0$, the focus positions can be controlled on an image plane by moving a focus lens unit or the like, and it is effective in this embodiment. In this embodiment, when a value exceeds the upper limit or the lower limit of conditional expression (4), it is difficult to keep the focus position approximately constant during the change from the normal state to the distortion change state, and it is not preferable.

When the unit A has a negative refractive power, the distortion can be greatly changed while the unit A moves parallel to the optical axis. Accordingly, it is preferred that the unit A has a negative refractive power. In addition, it is preferred that the unit A includes at least one lens having an aspherical surface. When the unit A moves during the change from the normal state to the distortion change state, a diameter (hˆ) where an off-axis light beam passes through a lens in the unit A is changed. Accordingly, including an aspherical lens in the unit A, the distortion can be effectively controlled, and the distortion can be optically changed while a good image quality is maintained.

As described above, the optical system of this embodiment includes the aperture stop, the unit A which moves during a distortion adjustment, and the unit B which is disposed at the image side relative to the unit A and moves with a locus different from a locus of the unit A during the distortion adjustment. The optical system changes from the first optical state (normal state) having a first distortion to the second optical state (distortion change state) having a second distortion larger than the first distortion during the distortion adjustment. The focal lengths fA and fB of the unit A and the unit B, the moving amounts XA and XB of the unit A and the unit B during the change from the first optical state to the second optical state, and the distances LA and LB on the optical axis from the aperture stop to the unit A and the unit B satisfy conditional expression (1). The distance AL on the optical axis from the lens surface of the unit A closest to the object side to the image plane, and the total optical length TL of the optical system satisfy conditional expression (2).

Preferably, the distortions D1 and D2 of the optical system in the first optical state and the second optical state and the focal lengths f1 and f2 of the entire system of the optical system in the first optical state and the second optical state satisfy conditional expression (3), where F=(f2−f1)× 100/f2 and ΔD=D2−D1. Preferably, the image-plane position sensitivities SA and SB of the unit A and the unit B satisfy conditional expression (4).

Preferably, the unit A and the unit B move so that the focus length of the optical system is constant or increases during the change from the first optical state to the second optical state. More preferably, the unit A is constituted by a single lens having a negative refractive power.

Preferably, the optical system is a zoom lens. The zoom lens includes, in order from the object side to the image side, a first lens unit L1 having a negative refractive power and a second lens unit L2 having a positive refractive power, and an interval between lens units adjacent to each other changes during zooming. The unit A is a lens constituted by a part of the first lens unit L1.

As described above, according to this embodiment, an optical system can be provided which is capable of changing the distortion while a good image quality is maintained. More preferably, the optical system of this embodiment is set to satisfy conditional expressions (2a) to (4a) below.

$$AL/TL>0.8 \quad (2a)$$

$$-1.5<F/\Delta D<0.2 \quad (3a)$$

$$-1.5<(SA\times XA)/(SB\times XB)<-0.7 \quad (4a)$$

Hereinafter, with respect to the optical system of this embodiment, the configuration of an optical system in each embodiment (example) will be specifically described.

[Embodiment 1]

Figure 1B:
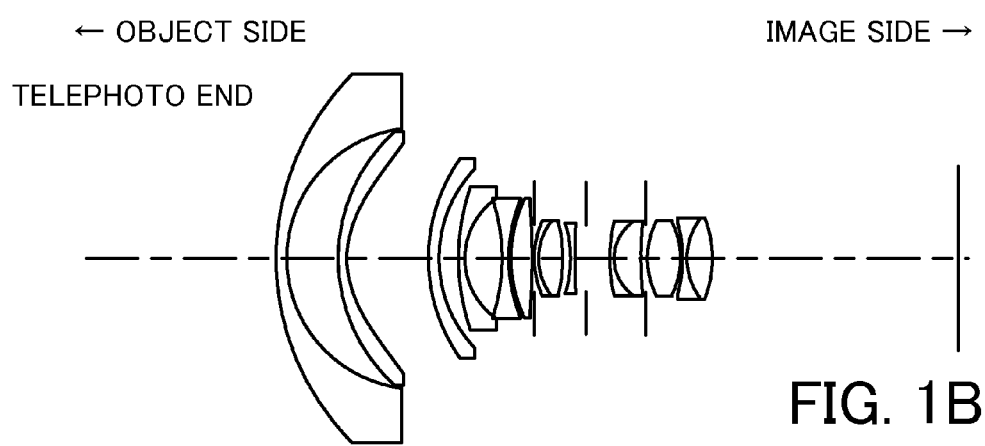
Figure 1C:
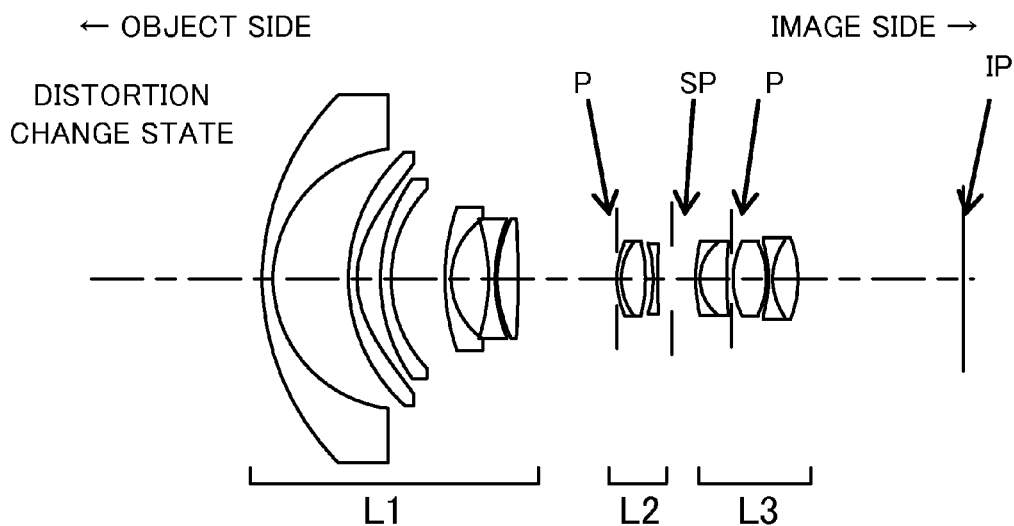
Figure 2A:
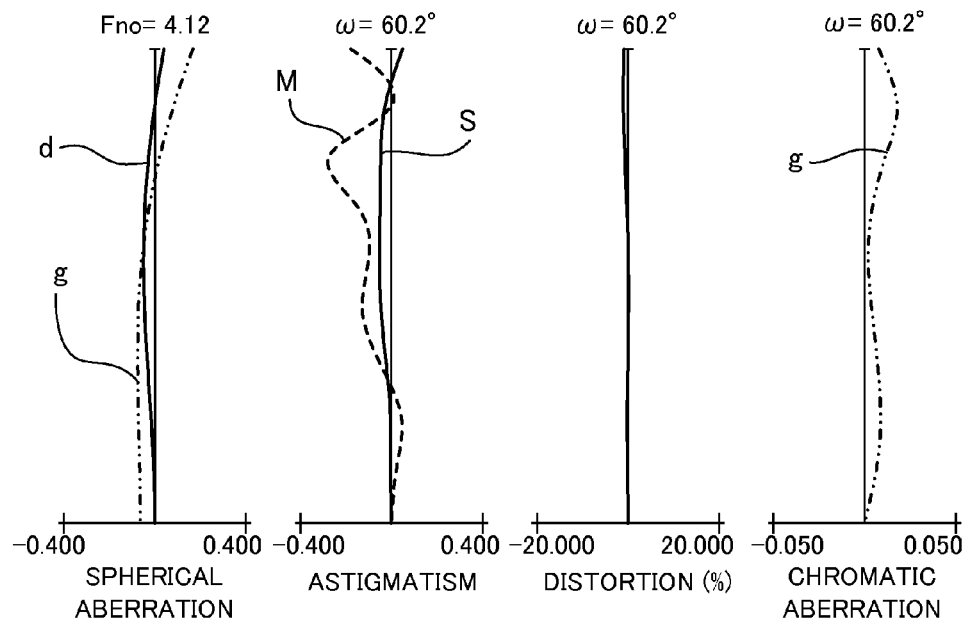
FIGS. 2A to 2C are longitudinal aberration diagrams of the optical system in Embodiment 1.
Figure 2B:
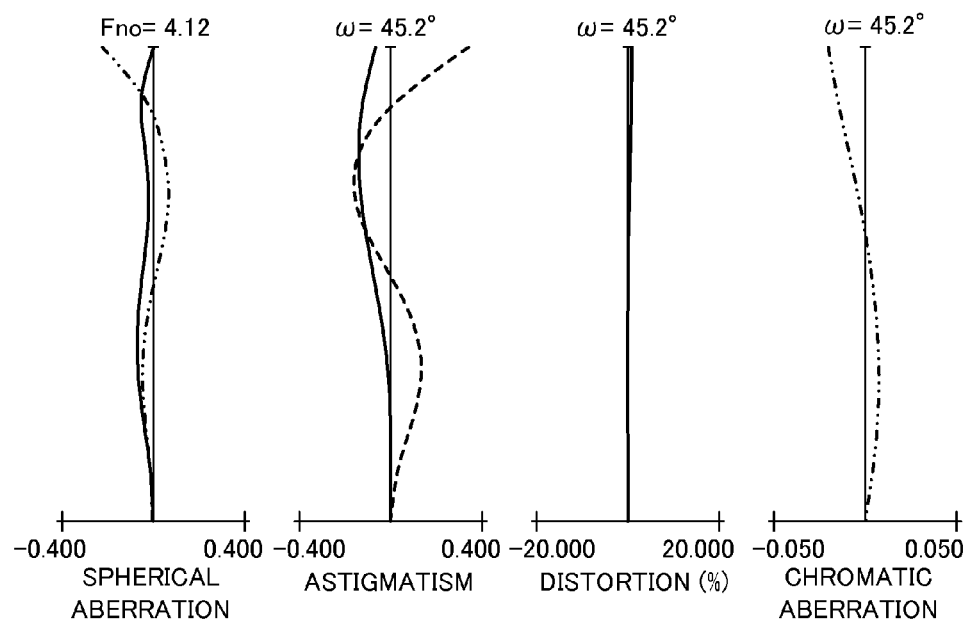
Figure 2C:
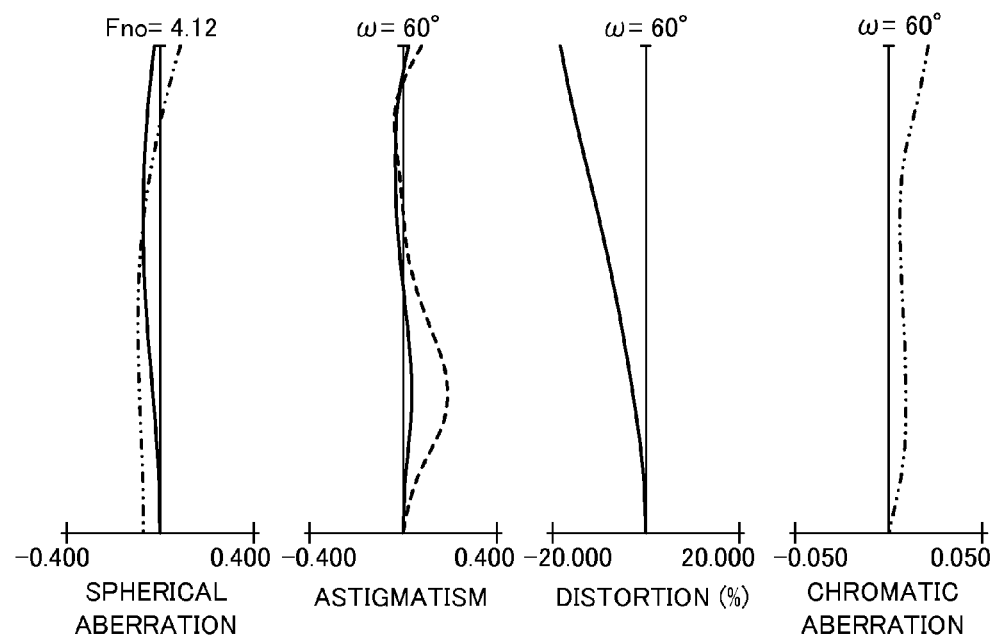

First of all, referring to FIGS. 1A to 1C and 2A to 2C, an optical system in Embodiment 1 of the present invention will be described. FIGS. 1A to 1C are cross-sectional views of the optical system in this embodiment. The left side in each of FIGS. 1A to 1C indicates an object side, and the right side in each of FIGS. 1A to 1C indicates an image side. FIGS. 2A to 2C are longitudinal aberration diagrams of the optical system in an infinity in-focus state. In the longitudinal aberration diagrams of FIGS. 2A to 2C, symbols d, g, M, and S denote a d-line, a g-line, a meridional image plane, and a sagittal image plane, respectively. Each of units of spherical aberration, astigmatism, and chromatic aberration diagrams in the longitudinal aberration diagrams of FIGS. 2A to 2C is millimeter. FIGS. 1A and 2A illustrate the optical system at a wide-angle end (in the normal state), FIGS. 1B and 2B illustrate the optical system at a telephoto end, and FIGS. 1C and 2C illustrate the optical system in the distortion change state.

The optical system of this embodiment is constituted, in order from the object side to the image side, by a first lens unit L1 having a negative refractive power, a second lens unit L2 having a positive refractive power, and a third lens unit L3 having a positive refractive power. The unit A as a lens element which integrally moves during the distortion adjustment is a lens disposed at a second position of the first lens unit L1 from the object side. The unit B is a lens disposed at a third position of the first lens unit L1 from the object side. In FIGS. 1A to 1C, symbols SP, P, and IP denote an aperture stop, a flare cut stop, and an image plane, respectively.

During varying the magnification (i.e., during the zooming) from the wide-angle end illustrated in FIG. 1A to the telephoto end illustrated in FIG. 1B, the first lens unit L1 moves to the image side with a convex locus with respect to the image plane IP, the second lens unit L2 moves to the object side, and the third lens unit L3 moves to the object side. In this time, an air gap (interval) between the first lens unit L1 and the second lens unit L2 is reduced, and an air gap (interval) between the second lens unit L2 and the third lens unit L3 is also reduced.

In this embodiment, the wide-angle end illustrated in FIG. 1A corresponds to the normal state. During the change from the normal state (first optical state) to the distortion change state (second optical state), the unit A moves to the image side and the unit B moves to the object side. A position of the image plane IP (image-plane position) is approximately constant during the change of the normal state to the distortion change state.

As described above, the optical system of this embodiment can optically change the distortion while maintaining a good image quality.

[Embodiment 2]

Figure 3A:
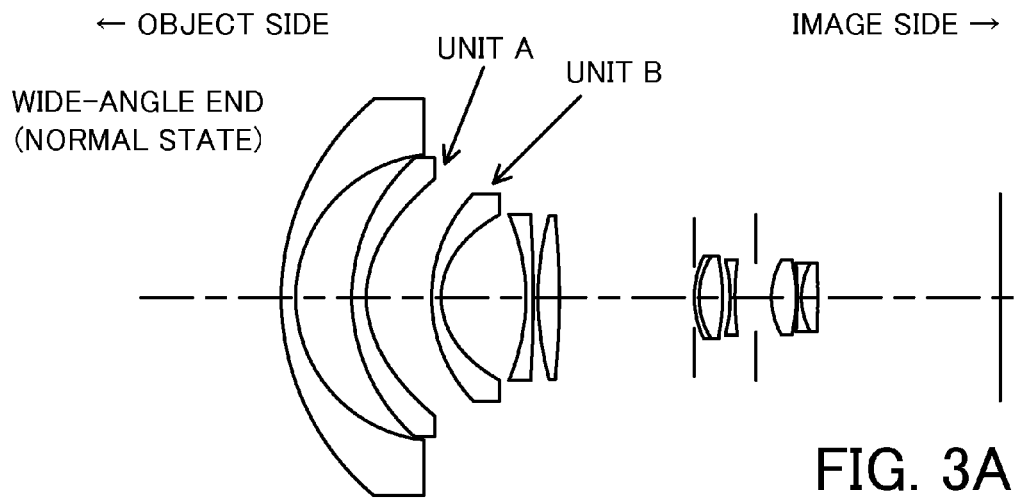
FIGS. 3A to 3C are cross-sectional view of an optical system in Embodiment 2.
Figure 3B:
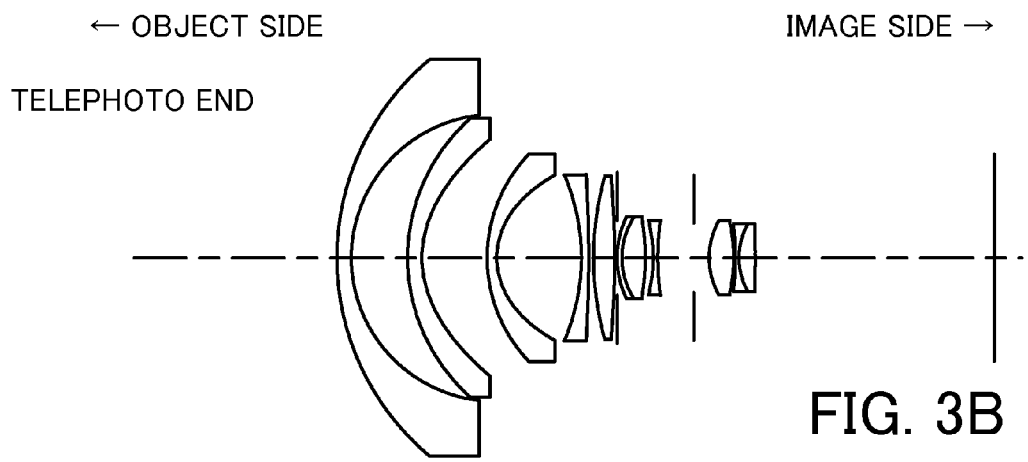
Figure 3C:
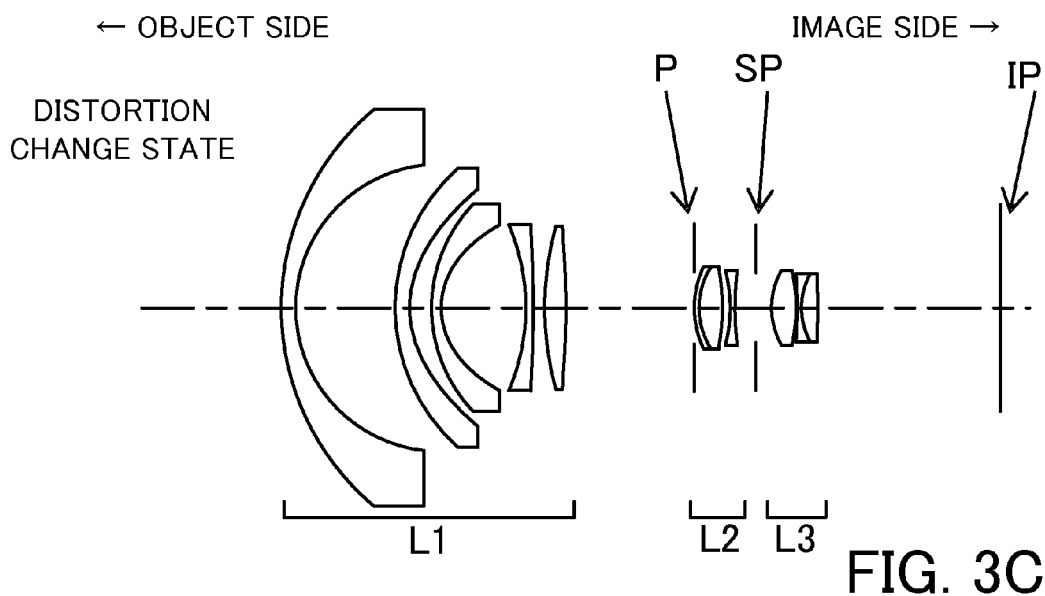
Figure 4A:
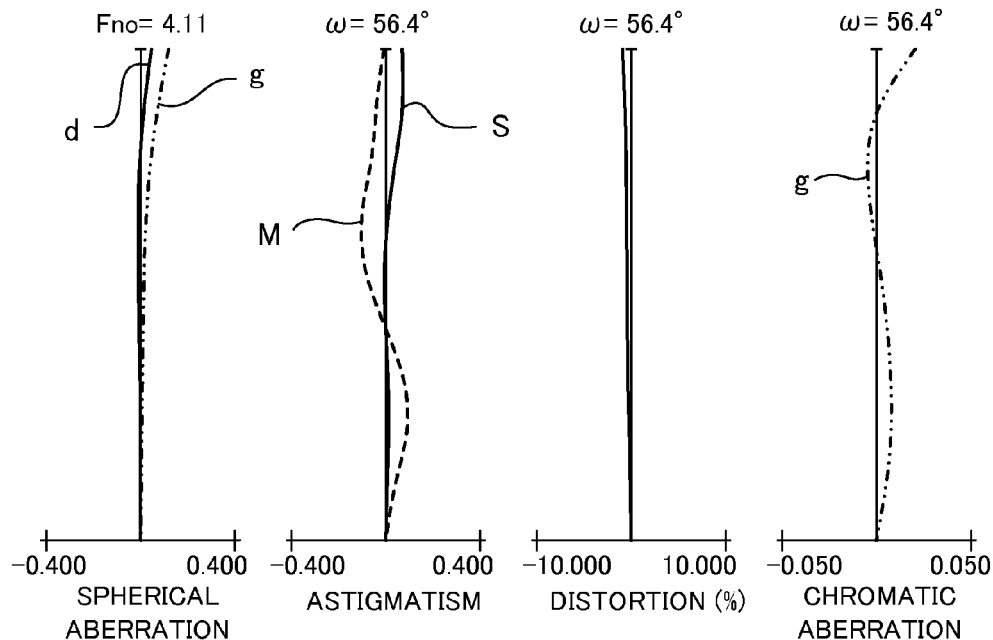
FIGS. 4A to 4C are longitudinal aberration diagrams of the optical system in Embodiment 2.
Figure 4B:
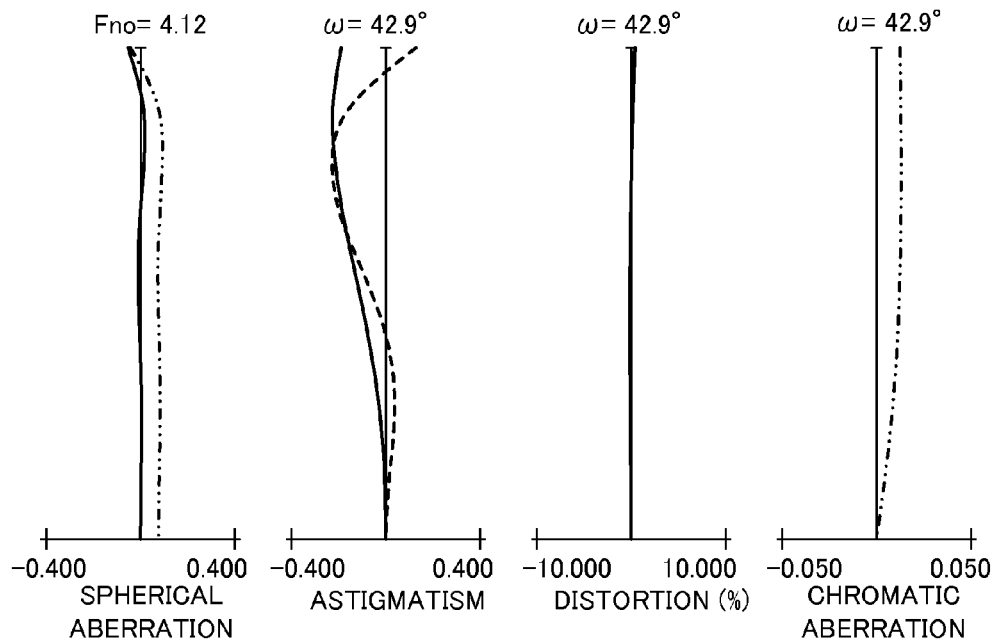
Figure 4C:
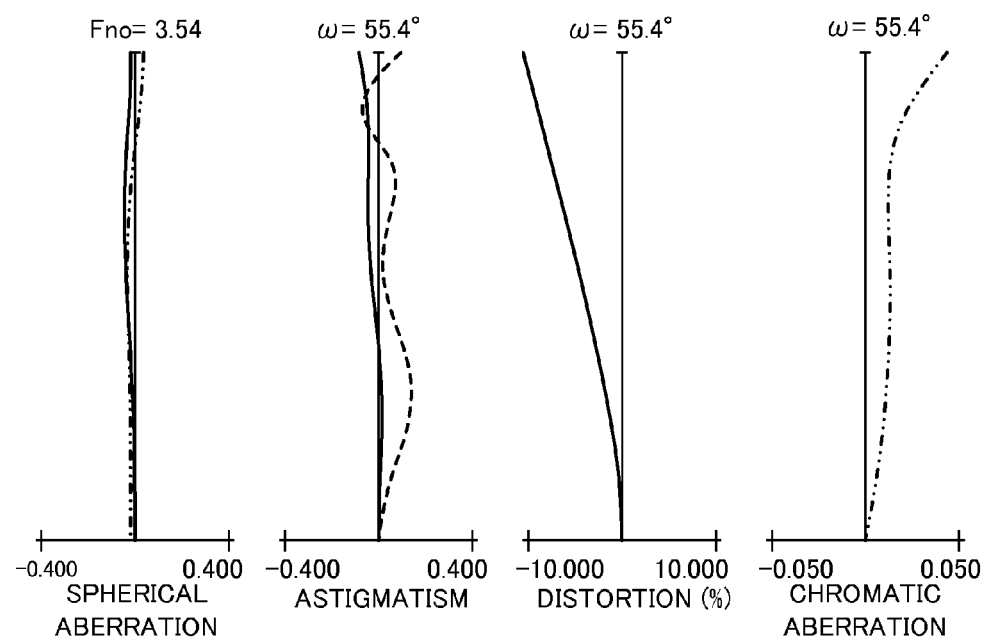

Next, referring to FIGS. 3A to 3C and 4A to 4C, an optical system in Embodiment 2 of the present invention will be described. FIGS. 3A to 3C are cross-sectional views of the optical system in this embodiment. The left side in each of FIGS. 3A to 3C indicates an object side, and the right side in each of FIGS. 3A to 3C indicates an image side. FIGS. 4A to 4C are longitudinal aberration diagrams of the optical system in an infinity in-focus state. In the longitudinal aberration diagrams of FIGS. 4A to 4C, symbols d, g, M, and S denote a d-line, a g-line, a meridional image plane, and a sagittal image plane, respectively. Each of units of spherical aberration, astigmatism, and chromatic aberration diagrams in the longitudinal aberration diagrams of FIGS. 4A to 4C is millimeter. FIGS. 3A and 4A illustrate the optical system at a wide-angle end (in the normal state), FIGS. 3B and 4B illustrate the optical system at a telephoto end, and FIGS. 3C and 4C illustrate the optical system in the distortion change state.

The optical system of this embodiment is constituted, in order from the object side to the image side, by a first lens unit L1 having a negative refractive power, a second lens unit L2 having a positive refractive power, and a third lens unit L3 having a positive refractive power. The unit A as a lens element which integrally moves during the distortion adjustment is a lens disposed at a second position of the first lens unit L1 from the object side. The unit B is a lens disposed at a fifth position of the first lens unit L1 from the object side. In FIGS. 3A to 3C, symbols SP, P, and IP denote an aperture stop, a flare cut stop, and an image plane, respectively.

During varying the magnification (i.e., during the zooming) from the wide-angle end illustrated in FIG. 3A to the telephoto end illustrated in FIG. 3B, the first lens unit L1 moves to the image side, the second lens unit L2 moves to the object side, and the third lens unit L3 moves to the object side. In this time, an air gap (interval) between the first lens unit L1 and the second lens unit L2 is reduced, and on the other hand an air gap (interval) between the second lens unit L2 and the third lens unit L3 increases.

In this embodiment, the wide-angle end illustrated in FIG. 3A corresponds to the normal state. During the change from the normal state (first optical state) to the distortion change state (second optical state), the unit A moves to the image side and the unit B moves to the image side. A position of the image plane IP (image-plane position) is approximately constant during the change of the normal state to the distortion change state.

As described above, the optical system of this embodiment can optically change the distortion while maintaining a good image quality.

[Embodiment 3]

Figure 5A:
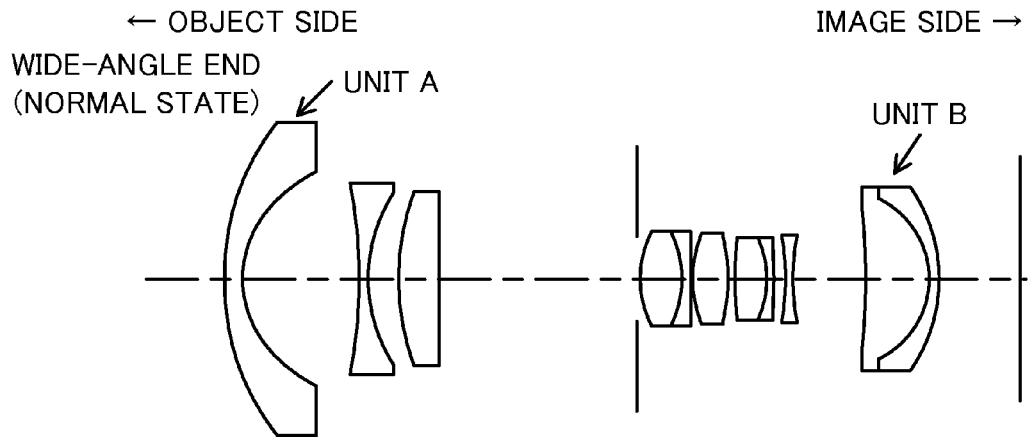
FIGS. 5A to 5C are cross-sectional view of an optical system in Embodiment 3.
Figure 5B:
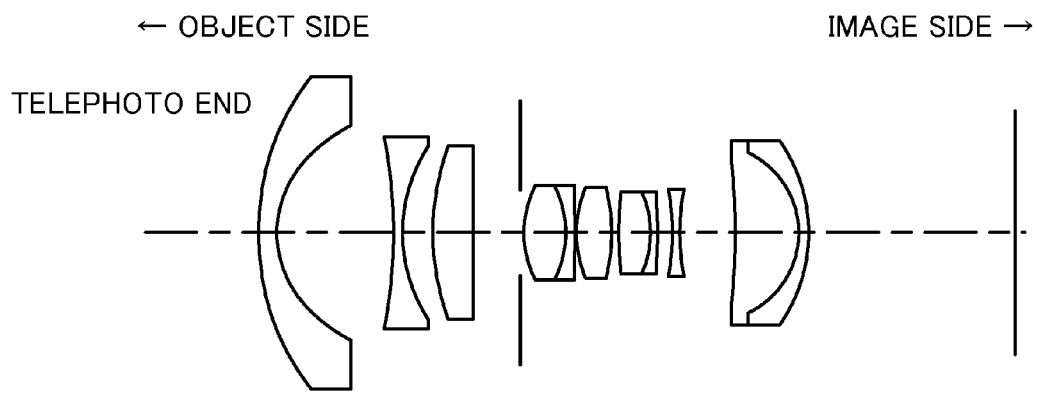
Figure 5C:
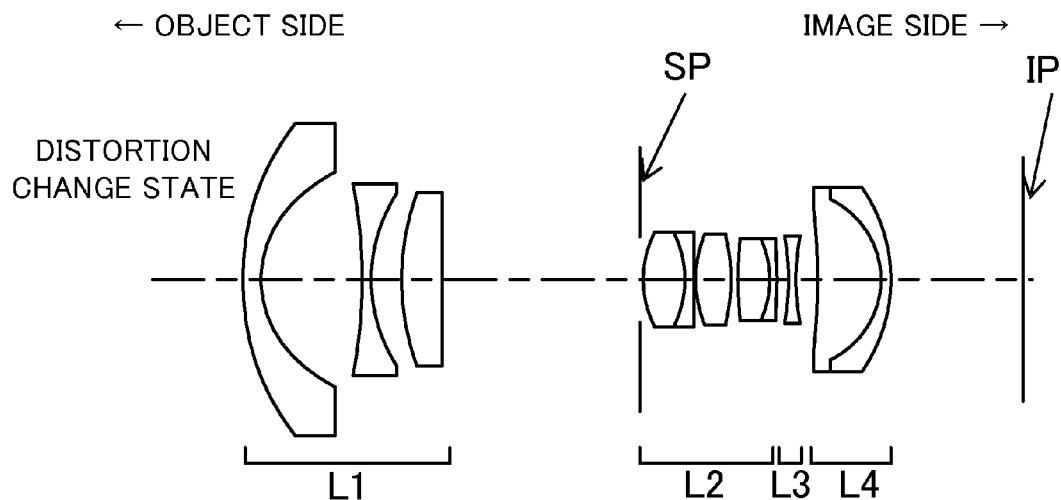
Figure 6A:
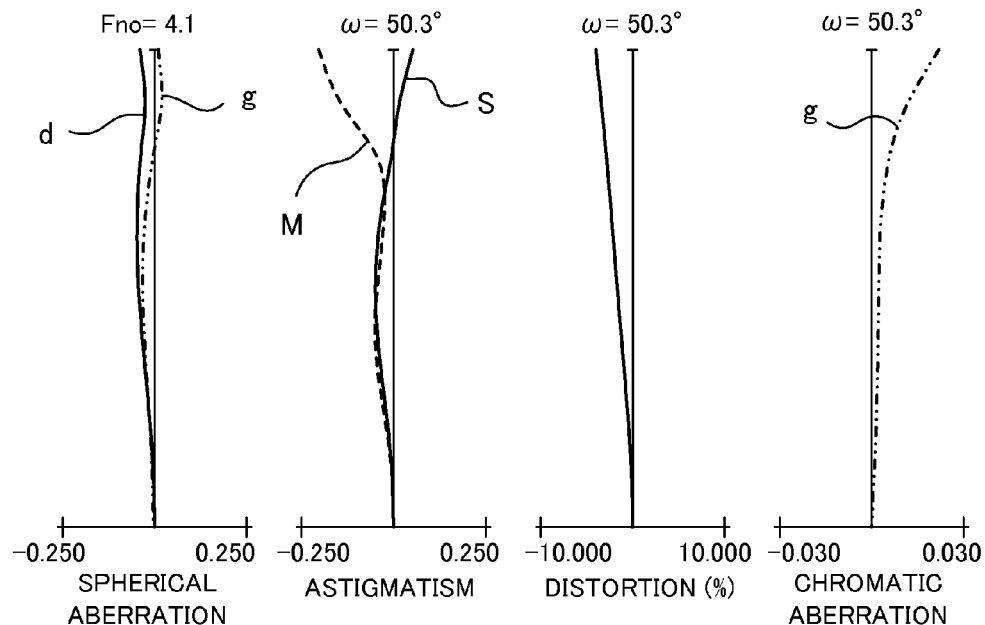
FIGS. 6A to 6C are longitudinal aberration diagrams of the optical system in Embodiment 3.
Figure 6B:
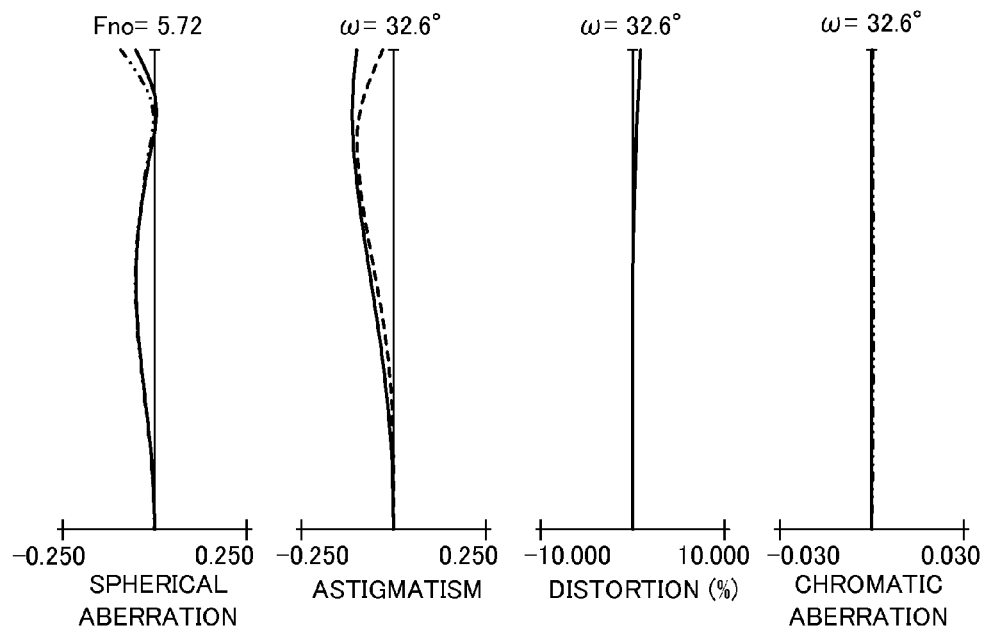
Figure 6C:
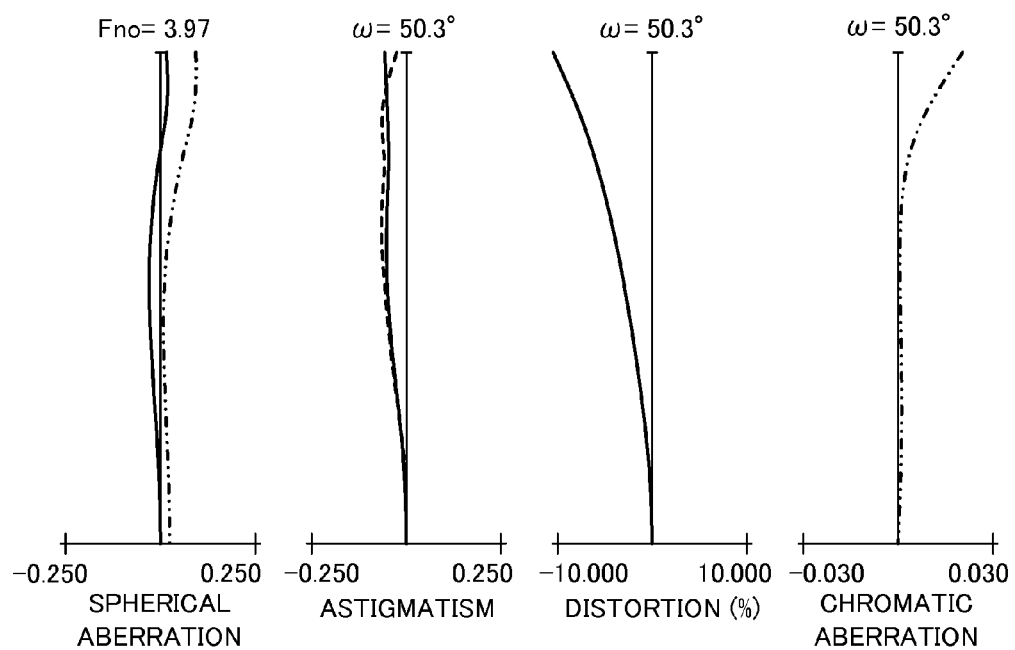

Next, referring to FIGS. 5A to 5C and 6A to 6C, an optical system in Embodiment 3 of the present invention will be described. FIGS. 5A to 5C are cross-sectional views of the optical system in this embodiment. The left side in each of FIGS. 5A to 5C indicates an object side, and the right side in each of FIGS. 5A to 5C indicates an image side. FIGS. 6A to 6C are longitudinal aberration diagrams of the optical system in an infinity in-focus state. In the longitudinal aberration diagrams of FIGS. 6A to 6C, symbols d, g, M, and S denote a d-line, a g-line, a meridional image plane, and a sagittal image plane, respectively. Each of units of spherical aberration, astigmatism, and chromatic aberration diagrams in the longitudinal aberration diagrams of FIGS. 6A to 6C is millimeter. FIGS. 5A and 6A illustrate the optical system at a wide-angle end (in the normal state), FIGS. 5B and 6B illustrate the optical system at a telephoto end, and FIGS. 5C and 6C illustrate the optical system in the distortion change state.

The optical system of this embodiment is constituted, in order from the object side to the image side, by a first lens unit L1 having a negative refractive power, a second lens unit L2 having a positive refractive power, a third lens unit L3 having a negative refractive power, and a fourth lens unit L4 having a positive refractive power. The unit A as a lens element which integrally moves during the distortion adjustment is a lens disposed closest to the object side in the first lens unit L1. The fourth lens unit corresponds to the unit B.

During varying the magnification (i.e., during the zooming) from the wide-angle end illustrated in FIG. 5A to the telephoto end illustrated in FIG. 5B, the first lens unit L1 moves to the image side with a convex locus with respect to the image plane IP, and the second lens unit L2 moves to the object side. Each of the third lens unit L3 and the fourth lens unit L4 moves to the object side. In this time, an air gap (interval) between the first lens unit L1 and the second lens unit L2 is reduced, an air gap (interval) between the second lens unit L2 and the third lens unit L3 increases, and an air gap (interval) between the third lens unit L4 and the fourth lens unit L4 is reduced.

In this embodiment, the wide-angle end illustrated in FIG. 5A corresponds to the normal state. During the change from the normal state (first optical state) to the distortion change state (second optical state), the unit A moves to the image side and the unit B moves to the object side. A position of the image plane IP (image-plane position) is approximately constant during the change of the normal state to the distortion change state.

As described above, the optical system of this embodiment can optically change the distortion while maintaining a good image quality.

[Embodiment 4]

Figure 7A:
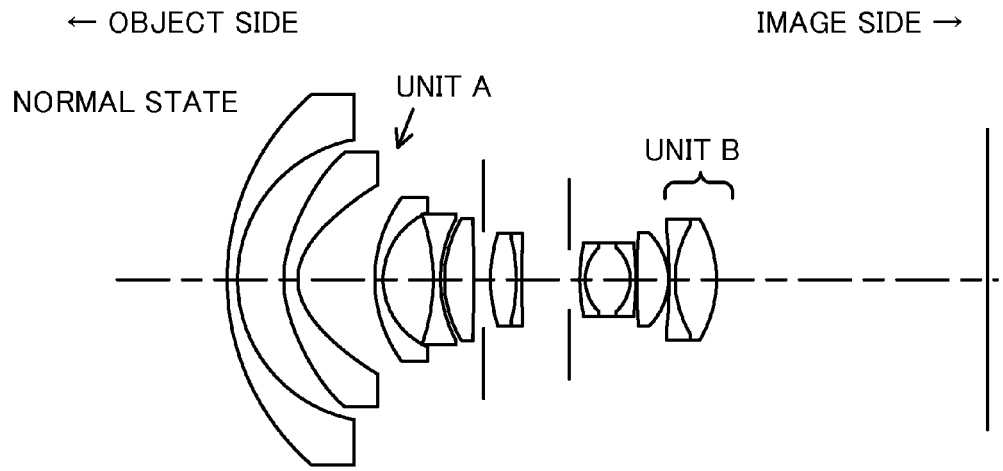
FIGS. 7A and 7B are cross-sectional view of an optical system in Embodiment 4.
Figure 7B:
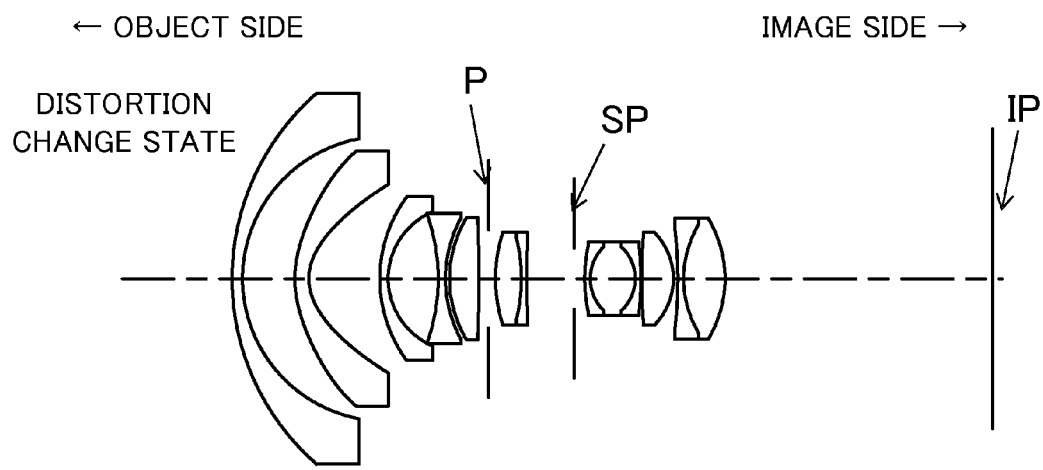
Figure 8A:
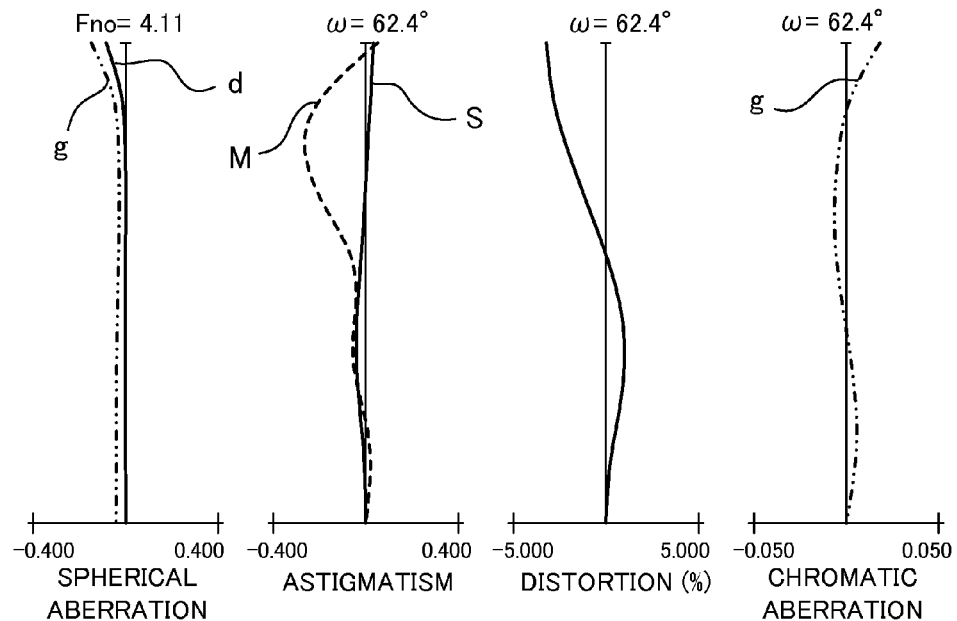
FIGS. 8A and 8B are longitudinal aberration diagrams of the optical system in Embodiment 4.
Figure 8B:
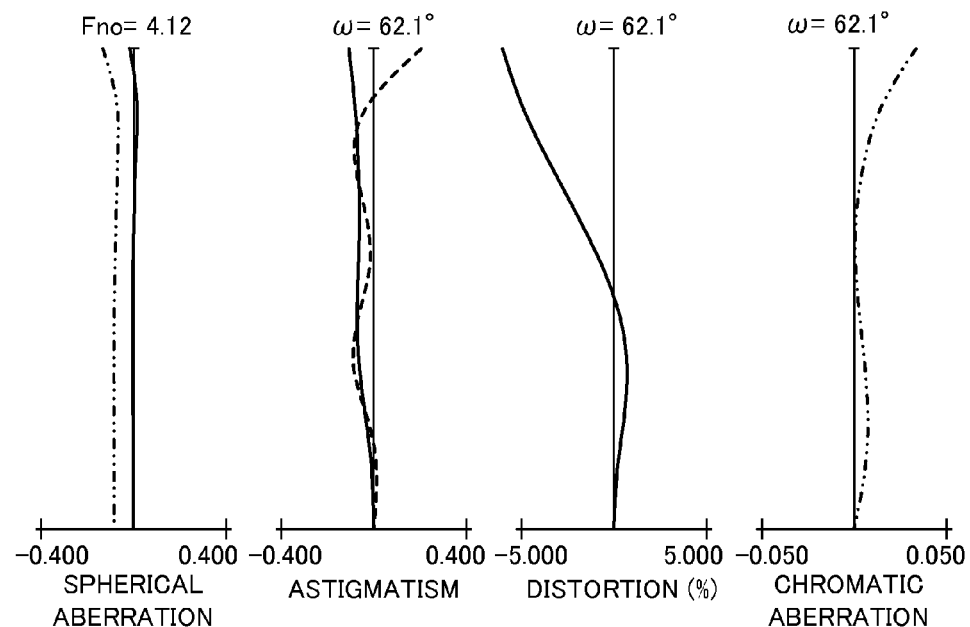

Next, referring to FIGS. 7A, 7B, 8A, and 8B, an optical system in Embodiment 4 of the present invention will be described. FIGS. 7A and 7B are cross-sectional views of the optical system in this embodiment. The left side in each of FIGS. 7A and 7B indicates an object side, and the right side in each of FIGS. 7A and 7B indicates an image side. FIGS. 8A and 8B are longitudinal aberration diagrams of the optical system in an infinity in-focus state. In the longitudinal aberration diagrams of FIGS. 8A and 8B, symbols d, g, M, and S denote a d-line, a g-line, a meridional image plane, and a sagittal image plane, respectively. Each of units of spherical aberration, astigmatism, and chromatic aberration diagrams in the longitudinal aberration diagrams of FIGS. 8A and 8B is millimeter. FIGS. 7A and 8A illustrate the optical system in the normal state, FIGS. 7B and 8B illustrate the optical system in the distortion change state.

The unit A as a lens element which integrally moves during the distortion adjustment is a lens disposed at a second position from the object side. A lens disposed at a first position and a lens disposed at a second position from the object side correspond to the unit B.

During the change from the normal state (first optical state) in FIG. 7A to the distortion change state (second optical state) in FIG. 7B, the unit A moves to the image side and the unit B moves to the image side. A position of the image plane IP (image-plane position) is approximately constant during the change of the normal state to the distortion change state.

As described above, the optical system of this embodiment can optically change the distortion while maintaining a good image quality.

[Embodiment 5]

Figure 9A:
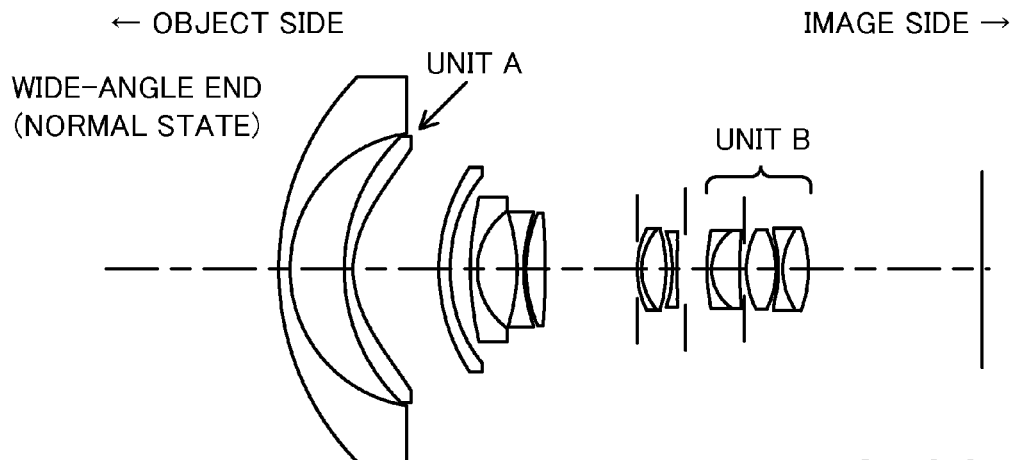
FIGS. 9A to 9C are cross-sectional view of an optical system in Embodiment 5.
Figure 9B:
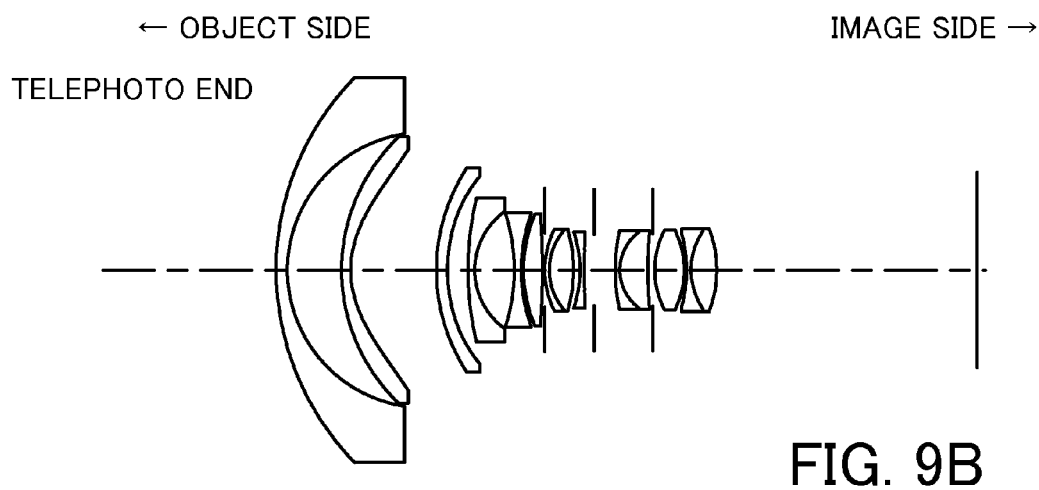
Figure 9C:
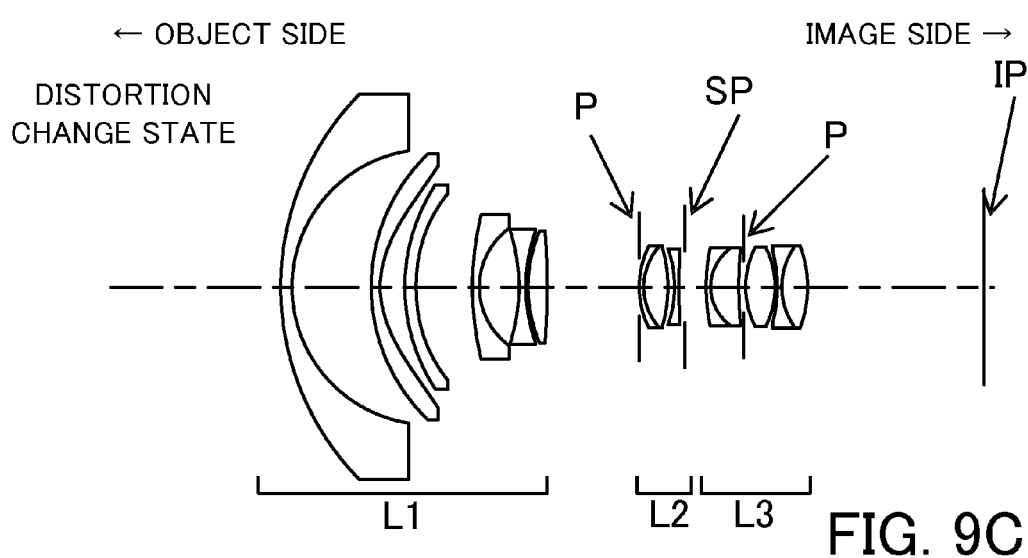
Figure 10A:
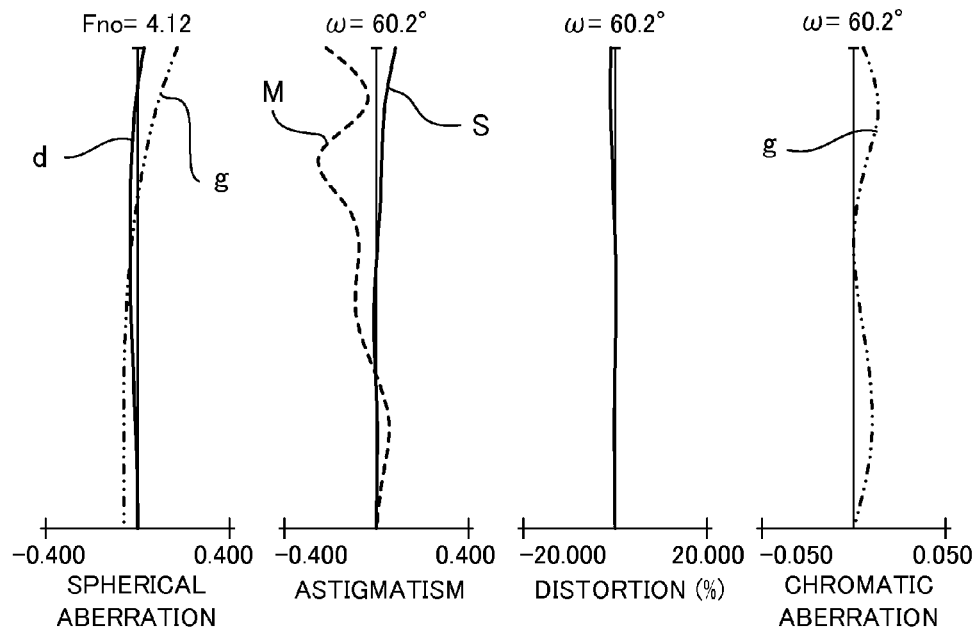
FIGS. 10A to 10C are longitudinal aberration diagrams of the optical system in Embodiment 5.
Figure 10B:
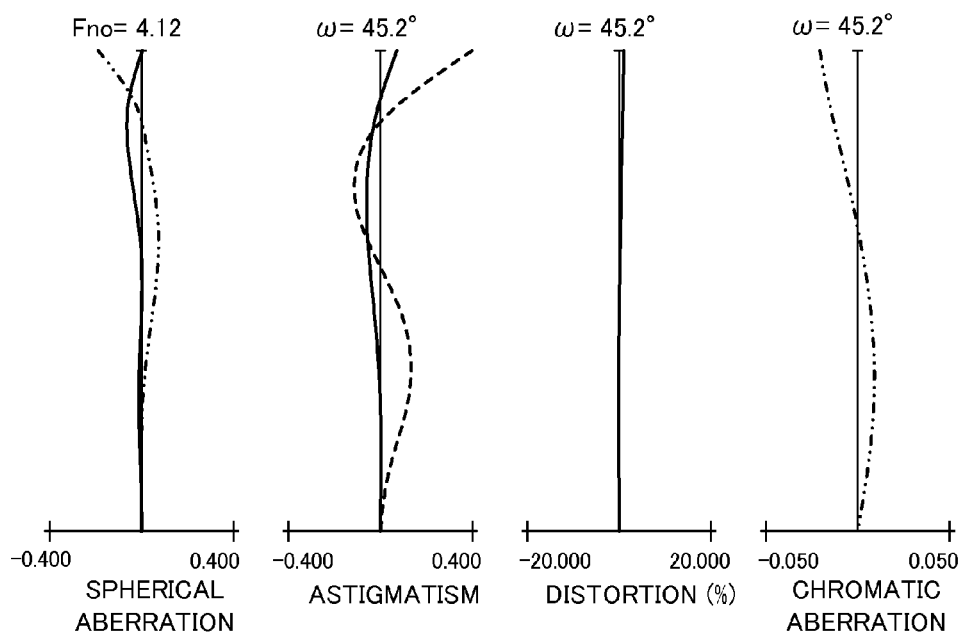
Figure 10C:
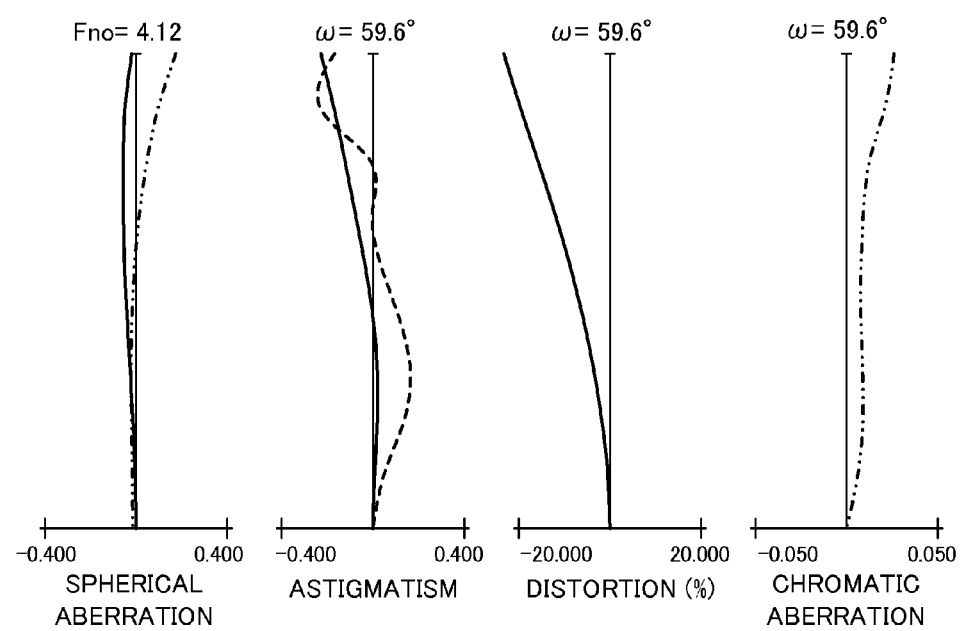

Next, referring to FIGS. 9A to 9C and 10A to 10C, an optical system in Embodiment 5 of the present invention will be described. FIGS. 9A to 9C are cross-sectional views of the optical system in this embodiment. The left side in each of FIGS. 9A to 9C indicates an object side, and the right side in each of FIGS. 9A to 9C indicates an image side. FIGS. 10A to 10C are longitudinal aberration diagrams of the optical system in an infinity in-focus state. In the longitudinal aberration diagrams of FIGS. 10A to 10C, symbols d, g, M, and S denote a d-line, a g-line, a meridional image plane, and a sagittal image plane, respectively. Each of units of spherical aberration, astigmatism, and chromatic aberration diagrams in the longitudinal aberration diagrams of FIGS. 10A to 10C is millimeter. FIGS. 9A and 10A illustrate the optical system at a wide-angle end (in the normal state), FIGS. 9B and 10B illustrate the optical system at a telephoto end, and FIGS. 9C and 10C illustrate the optical system in the distortion change state.

The optical system of this embodiment is constituted, in order from the object side to the image side, by a first lens unit L1 having a negative refractive power, a second lens unit L2 having a positive refractive power, and a third lens unit L3 having a positive refractive power. The unit A as a lens element which integrally moves during the distortion adjustment is a lens disposed at a second position of the first lens unit L1 from the object side. The third lens unit L3 corresponds to the unit B. In FIGS. 9A to 9C, symbols SP, P, and IP denote an aperture stop, a flare cut stop, and an image plane, respectively.

During varying the magnification (i.e., during the zooming) from the wide-angle end illustrated in FIG. 9A to the telephoto end illustrated in FIG. 9B, the first lens unit L1 moves to the image side with a convex locus with respect to the image plane IP, and the second lens unit L2 moves to the object side. The third lens unit L3 moves to the object side. In this time, an air gap (interval) between the first lens unit L1 and the second lens unit L2 is reduced, and on the other hand an air gap (interval) between the second lens unit L2 and the third lens unit L3 increases.

In this embodiment, the wide-angle end illustrated in FIG. 9A corresponds to the normal state. During the change from the normal state (first optical state) to the distortion change state (second optical state), the unit A moves to the image side and the unit B moves to the object side. A position of the image plane IP (image-plane position) is approximately constant during the change of the normal state to the distortion change state.

As described above, the optical system of this embodiment can optically change the distortion while maintaining a good image quality.

Figure 11:
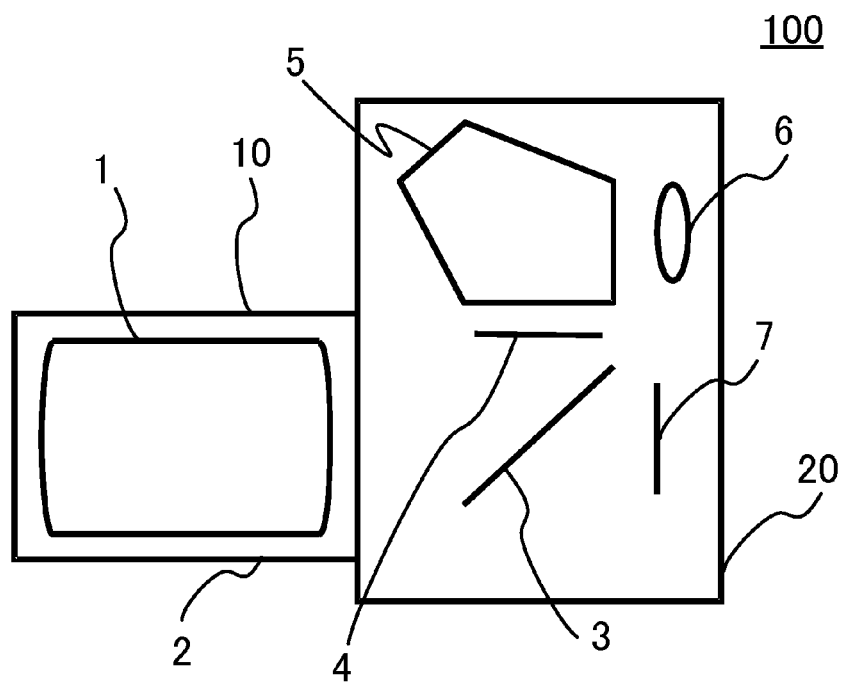
FIG. 11 is a configuration diagram of an optical device (image pickup apparatus) in each embodiment.

Next, referring to FIG. 11, an optical device including the optical system in each embodiment will be described. FIG. 11 is a configuration diagram of an image pickup apparatus 100 (single-lens reflex camera) as the optical device in this embodiment.

In FIG. 11, reference numeral 10 denotes a lens apparatus (interchangeable lens). The lens apparatus 10, for example, includes an image pickup optical system 1 (optical system) in any one of Embodiments 1 to 5. The image pickup optical system 1 is held on a lens barrel 2 as a holding member. Reference numeral 20 denotes a camera body (image pickup apparatus body). The camera body 20 includes a quick return mirror 3, a focusing glass 4, a penta-dach prism 5, an eyepiece lens 6, and the like. The quick return mirror 3 reflects a light beam formed via the image pickup optical system 1 upwardly. The focusing glass 4 is disposed at an image forming position of the image pickup optical system 1. The penta-dach prism 5 converts an inverse image formed on the focusing glass 4 into an erected image. A user can observe the erected image through the eyepiece lens 6. Reference numeral 7 denotes a photosensitive surface, and a solid-state image pickup element (a photoelectric conversion element), such as a CCD sensor and a CMOS sensor, that receives an optical image, or a silver salt film is disposed on the photosensitive surface 7. At the time of capturing an image, the quick return mirror 3 is removed from an optical path and an image (optical image) is formed on the photosensitive surface 7 by the image pickup optical system 1. As described above, the photoelectric conversion element receives the optical image formed via the image pickup optical system 1.

Applying the image pickup optical system 1 of this embodiment to the image pickup apparatus 100 such as a single-lens reflex camera, an optical device with a high optical performance can be achieved. The lens apparatus including the image pickup optical system 1 is an interchangeable lens removably attached to the camera body 20, and this embodiment can be applied also to an image pickup apparatus including the image pickup optical system 1 and the camera body 20 integrated with each other. The image pickup optical system 1 can be applied also to an optical device such as a telescope, binoculars, and a projector, as well as the digital camera, the video camera, the silver-salt film camera, or the like. Furthermore, the image pickup optical system 1 can be applied to a mirrorless single-lens reflex camera (mirrorless camera) that is not provided with a quick return mirror.

Figure 12:
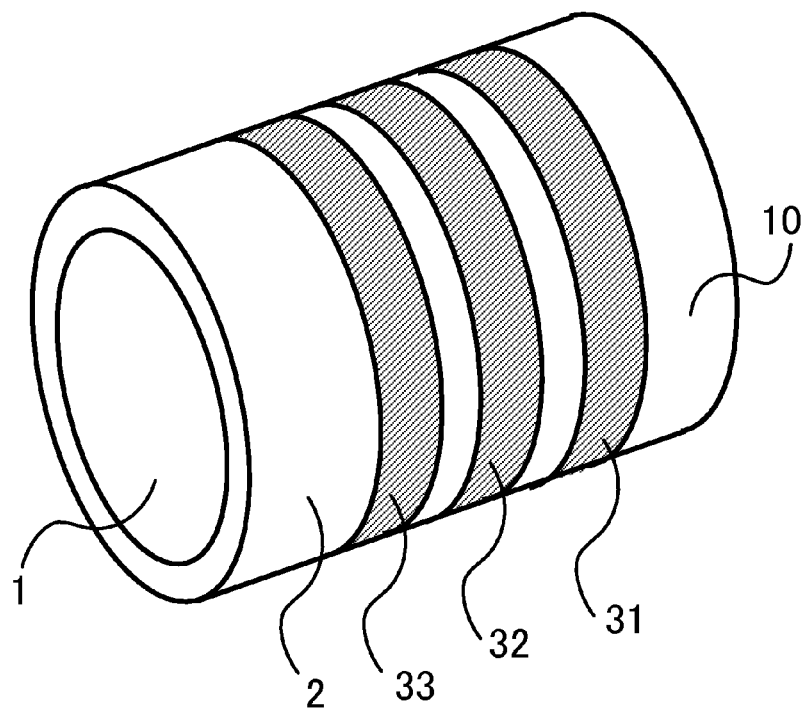
FIG. 12 is an external perspective view of a lens apparatus in each embodiment.

Next, referring to FIG. 12, the configuration of the lens apparatus 10 (optical device) in this embodiment will be described. FIG. 12 is an external perspective view of the lens apparatus 10. The lens apparatus 10 includes, for example, the image pickup optical system 1 (optical system) in any one of Embodiments 1 to 5 described above. The image pickup optical system 1 is held by the lens barrel 2. The lens apparatus 10 includes a zooming operation unit 31, a focusing operation unit 32, and a distortion operation unit 33 (distortion adjuster). When a user operates the zooming operation unit 31, positions of the lens units in the image pickup optical system 1 are mechanically or electrically changed, and accordingly a focal length can be changed. When the user operates the focusing operation unit 32, a focus position (in-focus position) of the image pickup optical system 1 can be changed. When the user operates the distortion operation unit 33, the positions of the lens units in the image pickup optical system 1 are mechanically or electrically changed, and accordingly the image pickup optical system 1 can be changed from the normal state to the distortion change state.

As illustrated in FIG. 12, each of the zooming operation unit 31, the focusing operation unit 32, and the distortion operation unit 33 has a ring shape, but the shape of each operation unit is not limited to the ring shape and other shapes can also be applied. Each operation unit may be a button to electrically move (i.e., control the movement of) each lens unit. The lens apparatus 10 may not include one or both of the zooming operation unit 31 and the focusing operation unit 32. The lens apparatus 10 may include a stop operation unit that changes a diameter of an aperture stop, in addition to the zooming operation unit 31, the focusing operation unit 32, and the distortion operation unit 33.

As described above, the optical device (lens apparatus) of this embodiment includes the aperture stop, the unit A that moves during the distortion adjustment, and the unit B that is disposed at the image side relative to the unit A and that moves with a locus different from a locus of the unit A during the distortion adjustment, and the distortion adjuster (distortion operation unit) that performs the distortion adjustment. The unit A and the unit B move in an optical axis direction with the loci different from each other in response to an operation of the distortion adjuster. The optical system changes from the first optical state (normal state) having the first distortion to the second optical state (distortion change state) having the second distortion larger than the first distortion according to movements of the unit A and the unit B. Preferably, the optical device further includes the zooming operation unit that changes the focal length and the focusing operation unit that changes the focus position.

According to each embodiment, an optical system, an image pickup apparatus, and an optical device can be provided which are capable of optically changing distortion while a good image quality is maintained.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

Hereinafter, Numerical examples 1 to 5 that correspond to Embodiments 1 to 5, respectively, are indicated. In each numerical example, symbol i denotes a surface number (i.e., order of a surface counted from the object side), symbol ri denotes a radius of curvature of the i-th surface, symbol di denotes an interval between the i-th surface and the (i+1)-th surface, and symbols nd1 and vd1 denote a refractive index and Abbe's number with reference to the d-line, respectively. Each of units of ri and di is millimeter. Symbol BF denotes a back focus.

With respect to each item of data in Numeral examples 1, 2, 3, and 5, the focal length, the air gap, and the like represent, in order from the left, values of a wide-angle end, an intermediate focal length region, a telephoto end, and a distortion change state. The wide-angle end corresponds to the normal state. With respect to each item of data in Numerical example 4, in order from the left, values in the normal state and the distortion change state are represented. An aspherical surface is represented by adding a sign "*" after the surface number. An aspherical shape is represented as expression (5) below, where symbol X is a displacement from the apex of a surface in the optical axis direction, symbol h is a height from the optical axis in a direction perpendicular to the optical axis, symbol r is a paraxial radius of curvature, symbol K is a conic constant, and each of symbols B, C, D, E, F, and G is an aspherical coefficient for each order.

$$X(h) = \frac{(1/r)h^2}{1+\sqrt{\{1-(1+K)(h/r)^2\}}} + B \cdot h^4 + C \cdot h^6 + D \cdot h^8 + E \cdot h^{10} + F \cdot h^{12} + G \cdot h^{14} \quad (5)$$

In each aspherical coefficient, the description of "E±XX" means "×10$^{±XX}$". Table 2 indicates numerical values relating to conditional expressions (1) to (4) described above. Table 3 indicates numerical values corresponding to conditional expressions (1) to (4) described above.

NUMERICAL EXAMPLE 1

Unit [mm]

Surface data

| Surface number | ri | di | ndi | vdi | Effective diameter |
|---|---|---|---|---|---|
| 1 | 61.454 | 2.50 | 1.88300 | 40.8 | 83.36 |
| 2 | 30.651 | (variable) | | | 59.40 |
| 3 | 40.238 | 2.00 | 1.76385 | 48.5 | 58.07 |
| 4* | 22.503 | (variable) | | | 54.05 |
| 5 | 40.816 | 2.50 | 1.88300 | 40.8 | 45.47 |
| 6* | 33.127 | (variable) | | | 40.76 |
| 7 | 51.038 | 1.50 | 1.49700 | 81.5 | 32.25 |
| 8 | 17.217 | 8.71 | | | 26.90 |
| 9 | −44.249 | 1.50 | 1.49700 | 81.5 | 26.83 |
| 10 | 36.231 | 0.50 | | | 26.50 |
| 11 | 31.834 | 4.95 | 1.83400 | 37.2 | 26.80 |
| 12 | −181.295 | (variable) | | | 26.42 |
| 13 | ∞ | 0.00 | | | 15.99 |
| 14 | 21.630 | 1.00 | 1.84666 | 23.9 | 16.47 |
| 15 | 14.145 | 5.64 | 1.61340 | 44.3 | 16.06 |
| 16 | −34.977 | 1.80 | | | 15.93 |
| 17 | −28.664 | 1.00 | 1.77250 | 49.6 | 15.25 |
| 18 | 182.134 | (variable) | | | 15.30 |
| 19(Stop) | ∞ | 5.63 | | | 15.56 |
| 20 | 37.342 | 1.00 | 1.91082 | 35.3 | 16.26 |
| 21 | 10.591 | 6.27 | 1.72825 | 28.5 | 15.70 |
| 22 | 101.844 | 1.00 | | | 15.88 |
| 23 | ∞ | 0.50 | | | 16.02 |
| 24 | 19.607 | 7.70 | 1.49700 | 81.5 | 16.51 |
| 25 | −19.134 | 0.50 | | | 15.81 |
| 26* | −31.474 | 1.00 | 1.83400 | 37.2 | 15.60 |
| 27 | 15.685 | 5.92 | 1.49700 | 81.5 | 16.68 |
| 28 | −26.032 | (variable) | | | 17.96 |
| Image plane | ∞ | | | | |

Aspherical data

Fourth surface

K = −8.11999e−001, A4 = −5.33236e−006, A6 = −1.54255e−008, A8 = 5.34143e−011, A10 = −9.97157e−014, A12 = 9.05261e−017, A14 = −3.32091e−020
Sixth surface K = 2.54156e−001, A4 = 7.12178e−006, A6 = −1.59282e−008, A8 = 1.62261e−011, A10 = −2.78597e−015, A12 = −1.52035e−017

Twenty-sixth surface

K = 9.02795e+000, A4 = 2.22817e−005, A6 = 3.81811e−008, A8 = 8.05195e−009, A10 = −1.05000e−010, A12 = 8.79476e−013

Various data

| Focal length | 12.40 | 16.79 | 21.50 | 12.49 |
|---|---|---|---|---|
| F number | 4.12 | 4.12 | 4.12 | 4.12 |
| Half angle of view | 60.18 | 52.18 | 45.18 | 59.99 |
| Image height | 21.64 | 21.64 | 21.64 | 21.64 |
| Total lens length | 163.14 | 157.72 | 158.81 | 163.14 |
| BF | 38.39 | 47.46 | 57.21 | 38.39 |
| d2 | 11.98 | 11.98 | 11.98 | 17.52 |
| d4 | 19.00 | 19.00 | 19.00 | 5.46 |
| d6 | 4.48 | 4.48 | 4.48 | 12.48 |
| d12 | 22.94 | 9.09 | 0.50 | 22.94 |
| d18 | 3.23 | 2.59 | 2.52 | 3.23 |
| d28 | 38.39 | 47.46 | 57.21 | 38.39 |

Data of zoom lens unit

| Unit | Start surface | Focal length |
|---|---|---|
| 1 | 1 | −17.85 |
| 2 | 14 | 77.20 |
| 3 | 20 | 44.43 |

| Start surface | End surface | Focal length |
|---|---|---|
| Data of unit A | | |
| 3 | 4 | −70.27 |
| Data of unit B | | |
| 5 | 6 | −235.00 |

NUMERICAL EXAMPLE 2

Unit [mm]

Surface data

| Surface number | ri | di | ndi | vdi | Effective diameter |
|---|---|---|---|---|---|
| 1 | 54.221 | 3.00 | 1.88300 | 40.8 | 80.00 |
| 2 | 30.036 | (variable) | | | 58.29 |
| 3 | 39.029 | 3.00 | 1.77250 | 49.6 | 56.91 |
| 4* | 22.163 | (variable) | | | 49.59 |
| 5 | 31.408 | 2.00 | 1.49700 | 81.5 | 42.08 |
| 6* | 15.811 | 17.67 | | | 34.59 |
| 7 | −43.849 | 1.50 | 1.53775 | 74.7 | 33.40 |
| 8 | −291.121 | (variable) | | | 33.28 |
| 9 | 63.361 | 4.42 | 1.74950 | 35.3 | 32.90 |
| 10 | −181.295 | (variable) | | | 32.46 |
| 11 | ∞ | 0.00 | | | 15.70 |
| 12 | 19.945 | 1.00 | 1.85478 | 24.8 | 16.04 |
| 13 | 15.824 | 4.86 | 1.57501 | 41.5 | 15.64 |
| 14 | −45.200 | 1.63 | | | 15.32 |
| 15 | −30.862 | 1.00 | 1.62052 | 58.4 | 14.69 |
| 16 | 66.542 | (variable) | | | 14.51 |
| 17(Stop) | ∞ | 3.21 | | | 14.59 |
| 18 | 15.825 | 5.13 | 1.49700 | 81.5 | 14.64 |
| 19 | −32.628 | 0.30 | | | 13.79 |
| 20 | −70.502 | 0.80 | 1.91082 | 35.3 | 13.22 |
| 21 | 14.573 | 3.38 | 1.58313 | 59.4 | 12.50 |
| 22* | −89.327 | (variable) | | | 12.21 |
| Image plane | ∞ | | | | |

-continued

| Unit [mm] |
|---|

Aspherical data

Fourth surface

K = −6.88974e−001, A4 = −2.50316e−006, A6 = −7.23420e−009,
A8 = 3.38423e−011, A10 = −8.47767e−014, A12 = 1.04407e−016,
A14 = −5.30401e−020

Sixth surface

K = −4.26124e−001, A4 = 6.08577e−006, A6 = −2.21942e−009,
A8 = −1.22356e−010, A10 = 6.52737e−013, A12 = −1.51921e−015

Twenty-second surface

K = 0.00000e+000, A4 = 6.28590e−005, A6 = 2.03360e−008,
A8 = 1.09045e−008, A10 = −2.43925e−010, A12 = 2.33770e−012

Various data

| Focal length | 14.40 | 17.00 | 23.30 | 14.95 |
|---|---|---|---|---|
| F number | 4.11 | 4.12 | 4.12 | 3.54 |
| Half angle of view | 56.35 | 51.84 | 42.88 | 55.36 |
| Image height | 21.64 | 21.64 | 21.64 | 21.64 |
| Total lens length | 149.68 | 143.10 | 136.86 | 149.68 |
| BF | 38.00 | 41.36 | 49.74 | 38.00 |
| d2 | 11.70 | 11.70 | 11.70 | 20.70 |
| d4 | 13.58 | 13.58 | 13.58 | 4.58 |
| d8 | 1.00 | 1.00 | 1.00 | 2.40 |
| d10 | 28.11 | 17.23 | 0.50 | 26.71 |
| d16 | 4.40 | 5.34 | 7.45 | 4.40 |
| d22 | 38.00 | 41.36 | 49.74 | 38.00 |

Data of zoom lens unit

| Unit | Start surface | Focal length |
|---|---|---|
| 1 | 1 | −28.13 |
| 2 | 12 | 80.20 |
| 3 | 18 | 50.90 |

| Start surface | End surface | Focal length |
|---|---|---|
| Data of unit A | | |
| 3 | 4 | −71.97 |
| Data of unit B | | |
| 9 | 10 | 63.13 |

NUMERICAL EXAMPLE 3

| Unit [mm] |
|---|

Surface data

| Surface number | ri | di | ndi | vdi | Effective diameter |
|---|---|---|---|---|---|
| 1* | 34.602 | 2.00 | 1.76385 | 48.5 | 33.67 |
| 2* | 11.887 | (variable) | | | 23.99 |
| 3 | −55.975 | 1.00 | 1.72916 | 54.7 | 20.22 |
| 4 | 17.825 | 3.37 | | | 18.16 |
| 5 | 28.168 | 4.51 | 1.90366 | 31.3 | 18.23 |
| 6 | ∞ | (variable) | | | 17.30 |
| 7(Stop) | ∞ | 0.40 | | | 9.54 |
| 8 | 11.670 | 4.65 | 1.42407 | 66.1 | 9.78 |
| 9 | −11.710 | 1.00 | 1.69680 | 55.5 | 9.38 |
| 10 | −901.269 | 0.20 | | | 9.40 |
| 11 | 13.311 | 3.92 | 1.49700 | 81.5 | 9.41 |
| 12 | −20.012 | 0.81 | | | 8.85 |
| 13 | 50.390 | 3.51 | 1.59522 | 67.7 | 8.40 |
| 14 | −10.957 | 0.80 | 1.85135 | 40.1 | 8.36 |
| 15* | −37.485 | (variable) | | | 8.51 |
| 16 | −25.311 | 0.80 | 1.83481 | 42.7 | 8.66 |
| 17 | 24.653 | (variable) | | | 9.05 |
| 18 | −70.258 | 7.06 | 1.53172 | 48.8 | 15.00 |
| 19 | −9.943 | 1.10 | 1.88300 | 40.8 | 16.72 |
| 20 | −18.019 | (variable) | | | 19.39 |
| Image plane | ∞ | | | | |

Aspherical data

First surface

K = 0.00000e+000, A4 = 2.00391e−005, A6 = −2.60052e−008,
A8 = −3.69546e−011, A10 = 1.10260e−013

Second surface

K = −5.12028e−001, A4 = 3.33543e−005, A6 = 1.09970e−007,
A8 = 6.82204e−010, A10 = −2.76427e−012

Fifteenth surface

K = 0.00000e+000, A4 = 2.18797e−004, A6 = 2.23195e−006,
A8 = −3.26024e−008, A10 = 1.10549e−009

Various data

| Focal length | 11.33 | 16.00 | 21.40 | 11.33 |
|---|---|---|---|---|
| F number | 4.10 | 4.81 | 5.72 | 3.97 |
| Half angle of view | 50.33 | 40.49 | 32.55 | 50.34 |
| Image height | 13.66 | 13.66 | 13.66 | 13.66 |
| Total lens length | 88.56 | 83.70 | 84.19 | 86.84 |
| BF | 9.00 | 16.86 | 22.96 | 14.71 |
| d2 | 13.00 | 13.00 | 13.00 | 11.28 |
| d6 | 21.99 | 11.32 | 5.23 | 21.99 |
| d15 | 1.30 | 1.49 | 1.64 | 1.30 |
| d17 | 8.13 | 5.89 | 6.21 | 2.42 |
| d20 | 9.00 | 16.86 | 22.96 | 14.71 |

Data of zoom lens unit

| Unit | Start surface | Focal length |
|---|---|---|
| 1 | 1 | −16.55 |
| 2 | 8 | 13.43 |
| 3 | 16 | −14.85 |
| 4 | 18 | 127.42 |

| Start surface | End surface | Focal length |
|---|---|---|
| Data of unit A | | |
| 1 | 2 | −24.65 |
| Data of unit B | | |
| 18 | 20 | 127.42 |

NUMERICAL EXAMPLE 4

| Unit [mm] |
|---|

Surface data

| Surface number | ri | di | ndi | vdi | Effective diameter |
|---|---|---|---|---|---|
| 1 | 35.472 | 1.50 | 1.77250 | 49.6 | 52.00 |
| 2 | 20.529 | (variable) | | | 39.06 |
| 3* | 16.217 | 2.00 | 1.58313 | 59.4 | 36.74 |
| 4* | 7.495 | (variable) | | | 27.18 |
| 5 | 19.913 | 1.20 | 1.49700 | 81.5 | 22.42 |
| 6 | 10.530 | 7.20 | | | 18.12 |
| 7 | −27.317 | 1.00 | 1.49700 | 81.5 | 17.60 |
| 8 | 18.279 | 0.59 | | | 16.35 |
| 9 | 17.002 | 4.25 | 1.80100 | 35.0 | 16.40 |
| 10 | −241.553 | 1.38 | | | 15.51 |

-continued

| Unit [mm] | | | | |
|---|---|---|---|---|
| 11 | ∞ | 1.00 | | 14.14 |
| 12 | 21.986 | 3.71 | 1.65412 | 39.7 | 12.42 |
| 13 | −24.055 | 0.80 | 1.84666 | 23.9 | 10.69 |
| 14 | 147.424 | 6.78 | | | 9.78 |
| 15(Stop) | ∞ | 1.50 | | | 8.78 |
| 16 | 22.640 | 0.80 | 1.83481 | 42.7 | 8.90 |
| 17 | 6.462 | 6.44 | 1.63980 | 34.5 | 8.60 |
| 18 | −6.327 | 0.80 | 1.91082 | 35.3 | 8.72 |
| 19 | −50.287 | 0.15 | | | 9.82 |
| 20 | 83.033 | 4.53 | 1.49700 | 81.5 | 10.70 |
| 21 | −9.546 | (variable) | | | 12.42 |
| 22* | −59.690 | 0.80 | 1.85400 | 40.4 | 13.62 |
| 23 | 15.071 | 5.97 | 1.49700 | 81.5 | 14.68 |
| 24 | −16.900 | (variable) | | | 16.27 |
| Image plane | ∞ | | | | |

Aspherical data

Third surface

K = −4.18459e−001, A4 = −6.54388e−005, A6 = 1.10873e−007,
A8 = −1.68832e−010, A10 = 8.04951e−014

Fourth surface

K = −9.24148e−001, A4 = −2.90983e−005, A6 = −5.03583e−007,
A8 = 3.75137e−009, A10 = −1.63301e−011, A12 = 3.81951e−014

Twenty-second surface

K = 0.00000e+000, A4 = −8.79608e−006, A6 = 2.16620e−007,
A8 = 1.37771e−009, A10 = −4.20297e−012

Various data

| Focal length | 11.33 | 11.47 |
|---|---|---|
| F number | 4.11 | 4.12 |
| Half angle of view | 62.36 | 62.08 |
| Image height | 21.64 | 21.64 |
| Total lens length | 109.13 | 109.12 |
| BF | 38.90 | 38.40 |
| d2 | 6.64 | 7.51 |
| d4 | 11.05 | 10.17 |
| d21 | 0.15 | 0.65 |
| d24 | 38.90 | 38.40 |

| Start surface | End surface | Focal length |
|---|---|---|
| Data of unit A | | |
| 3 | 4 | −26.10 |
| Data of unit B | | |
| 22 | 24 | −245.20 |

NUMERICAL EXAMPLE 5

Unit [mm]

Surface data

| Surface number | ri | di | ndi | vdi | Effective diameter |
|---|---|---|---|---|---|
| 1 | 61.126 | 2.50 | 1.88300 | 40.8 | 82.45 |
| 2 | 30.572 | (variable) | | | 59.02 |
| 3 | 40.846 | 2.00 | 1.76385 | 48.5 | 57.63 |
| 4* | 21.765 | (variable) | | | 53.52 |
| 5 | 41.390 | 2.50 | 1.88300 | 40.8 | 44.06 |
| 6* | 39.575 | (variable) | | | 40.17 |
| 7 | 67.409 | 1.50 | 1.49700 | 81.5 | 30.67 |
| 8 | 16.069 | 8.80 | | | 24.82 |
| 9 | −40.750 | 1.50 | 1.49700 | 81.5 | 24.25 |
| 10 | 36.457 | 0.50 | | | 23.60 |
| 11 | 31.345 | 4.22 | 1.83400 | 37.2 | 23.74 |
| 12 | −181.295 | (variable) | | | 23.31 |
| 13 | ∞ | 0.00 | | | 16.31 |
| 14 | 20.394 | 1.00 | 1.84666 | 23.9 | 16.89 |
| 15 | 13.525 | 5.37 | 1.61340 | 44.3 | 16.40 |
| 16 | −31.122 | 1.44 | | | 16.29 |
| 17 | −26.037 | 1.00 | 1.77250 | 49.6 | 15.65 |
| 18 | 537.252 | (variable) | | | 15.70 |
| 19(Stop) | ∞ | 4.76 | | | 15.82 |
| 20 | 42.391 | 1.00 | 1.91082 | 35.3 | 16.14 |
| 21 | 10.536 | 6.23 | 1.72825 | 28.5 | 15.58 |
| 22 | 101.847 | 1.00 | | | 15.75 |
| 23 | ∞ | 0.50 | | | 15.90 |
| 24 | 19.191 | 6.53 | 1.49700 | 81.5 | 16.40 |
| 25 | −19.645 | 0.50 | | | 15.88 |
| 26* | −32.483 | 1.00 | 1.83400 | 37.2 | 14.84 |
| 27 | 15.430 | 5.71 | 1.49700 | 81.5 | 15.84 |
| 28 | −25.495 | (variable) | | | 17.20 |
| Image plane | ∞ | | | | |

Aspherical data

Fourth surface

K = −8.35930e−001, A4 = −6.19488e−006, A6 = −1.56736e−008,
A8 = 4.96141e−011, A10 = −9.33806e−014, A12 = 8.75078e−017,
A14 = −3.29042e−020

Sixth surface

K = 1.71901e+000, A4 = 4.93127e−006, A6 = −5.06904e−009,
A8 = −4.57752e−011, A10 = 1.30477e−013, A12 = −1.61616e−016

Twenty-sixth surface

K = 1.01518e+001, A4 = 1.99944e−005, A6 = 1.53844e−007,
A8 = 6.00528e−009, A10 = −8.68237e−011, A12 = 9.14193e−013

Various data

| Focal length | 12.40 | 16.77 | 21.50 | 12.68 |
|---|---|---|---|---|
| F number | 4.12 | 4.12 | 4.12 | 4.12 |
| Half angle of view | 60.18 | 52.22 | 45.18 | 59.63 |
| Image height | 21.64 | 21.64 | 21.64 | 21.64 |
| Total lens length | 155.71 | 152.56 | 155.17 | 155.70 |
| BF | 38.39 | 47.59 | 57.60 | 39.04 |
| d2 | 11.98 | 11.98 | 11.98 | 17.52 |
| d4 | 19.00 | 19.00 | 19.00 | 5.46 |
| d6 | 4.48 | 4.48 | 4.48 | 12.48 |
| d12 | 20.39 | 8.17 | 0.50 | 20.39 |
| d18 | 1.91 | 1.77 | 2.05 | 1.25 |
| d28 | 38.39 | 47.59 | 57.60 | 39.04 |

Data of zoom lens unit

| Unit | Start surface | Focal length |
|---|---|---|
| 1 | 1 | −16.62 |
| 2 | 14 | 61.12 |
| 3 | 20 | 48.48 |

| Start surface | End surface | Focal length |
|---|---|---|
| Data of unit A | | |
| 3 | 4 | −63.90 |
| Data of unit B | | |
| 20 | 28 | 48.48 |

TABLE 2

| | EMBODIMENT | | | | |
|---|---|---|---|---|---|
| | 1 | 2 | 3 | 4 | 5 |
| f1 | 12.40 | 14.00 | 11.33 | 11.33 | 12.40 |
| f2 | 12.49 | 14.95 | 11.33 | 11.47 | 12.68 |
| D1 | −0.9 | −0.9 | −4.0 | −3.2 | −0.9 |
| D2 | −18.3 | −10.5 | −10.5 | −6.0 | −23.3 |
| fA | −70.27 | −71.97 | −24.65 | −26.10 | −63.90 |
| fB | −235.00 | 63.13 | 127.42 | −245.20 | 48.48 |
| XA | 5.54 | 9.00 | 1.72 | 0.88 | 5.54 |
| XB | −8.00 | 1.40 | −5.71 | 0.50 | −0.65 |
| LA | −80.76 | −84.17 | −45.88 | −40.95 | −75.61 |
| LB | −59.76 | −67.59 | 25.52 | 14.37 | 13.49 |
| AL | 148.66 | 134.98 | 88.57 | 100.99 | 141.23 |
| TL | 163.14 | 149.68 | 88.57 | 109.13 | 155.71 |
| SA1 | 0.116 | 0.138 | 0.211 | 0.404 | 0.132 |
| SB1 | 0.091 | −0.972 | 0.020 | −0.734 | 0.999 |
| SA2 | 0.128 | 0.169 | 0.211 | 0.421 | 0.150 |
| SB2 | 0.078 | −0.997 | 0.106 | −0.729 | 1.000 |
| F | 0.76 | 6.79 | −0.04 | 1.20 | 2.23 |
| ΔD | −17.4 | −9.6 | −6.5 | −2.8 | −22.4 |

TABLE 3

| | | EMBODIMENT | | | | |
|---|---|---|---|---|---|---|
| | | 1 | 2 | 3 | 4 | 5 |
| CONDITIONAL EXPRESSION | 1 | 0 | 0 | 0 | 0 | 0 |
| | 2 | 0.91 | 0.90 | 1.00 | 0.93 | 0.91 |
| | 3 | −0.04 | −0.71 | 0.01 | −0.43 | −0.10 |
| | 4 | −1.00 | −1.00 | −1.01 | −1.00 | −1.20 |

This application claims the benefit of Japanese Patent Application No. 2014-215363, filed on Oct. 22, 2014, which is hereby incorporated by reference wherein in its entirety.

What is claimed is:

1. An optical device comprising:
an optical system including an aperture stop, a unit A, and a unit B disposed at an image side relative to the unit A;
a distortion operation unit, which is a ring or a button, configured to move the unit A and the unit B with loci different from each other in an optical direction for performing a distortion adjustment;
a zooming operation unit, which is a ring or a button, configured to move a lens which moves in zooming for changing a focal length; and
a focusing operation unit, which is a ring or a button, configured to move a lens which moves in focusing for changing a focus position,
wherein:
the optical system changes an optical state from a first optical state having a first distortion to a second optical state having a second distortion larger than the first distortion by moving the unit A and the unit B, and
the distortion operation unit, the zooming operation unit, and the focusing operation unit are independently operable by a user.

2. The optical device according to claim 1, wherein a conditional expression below is satisfied:

$$(fA/|fA|) \times (XA/|XA|) \times (LA/|LA|) + (fB/|fB|) \times (XB/|XB|) \times (LB/|LB|) = 0,$$

where fA and fB are respectively focal lengths of the unit A and the unit B, XA and XB are respectively moving amounts of the unit A and the unit B during a change from the first optical state to the second optical state, and LA and LB are respectively distances on an optical axis from the aperture stop to the unit A and the unit B in the first optical state.

3. The optical device according to claim 1, wherein a conditional expression below is satisfied:

$$AL/TL > 0.7,$$

where AL is a distance on an optical axis from a lens surface of the unit A closest to an object side to an image plane in the first optical state, and TL is a total optical length of the optical system in the first optical state.

4. The optical device according to claim 1, wherein a conditional expression below is satisfied:

$$-2.0 < F/\Delta D < 0.5,$$

where $F = (f2 - f1) \times 100/f2$, $\Delta D = D2 - D1$, D1 and D2 are respectively distortions of the optical system in the first optical state and the second optical state, and f1 and f2 are respectively the focal lengths of the optical system in the first optical state and the second optical state.

5. The optical device according to claim 1, wherein a conditional expression below is satisfied:

$$-2.0 < (SA \times XA)/(SB \times XB) < -0.5,$$

where SA and SB are respectively image-plane position sensitivities of the unit A and the unit B.

6. The optical device according to claim 1, wherein the unit A and the unit B move so that the focal length of the optical system is constant or increases during the changing of the optical state from the first optical state to the second optical state.

7. The optical device according to claim 1, wherein the unit A is constituted by a single lens having a negative refractive power.

8. The optical device according to claim 1, wherein:
the optical system is a zoom lens,
the zoom lens includes, in order from the object side to the image side, a first lens unit having a negative refractive power and a second lens unit having a positive refractive power, and an interval between lens units adjacent to each other changes during zooming, and
the unit A is a lens constituted by a part of the first lens unit.

9. The optical device according to claim 1, wherein a distance between the unit A and the unit B is constant during zooming.

10. The optical device according to claim 1, wherein at least one of the unit A and the unit B moves with a locus during the distortion adjustment differently from a locus during zooming.

11. The optical device according to claim 1, wherein an image-plane position is substantially constant during the distortion adjustment.

12. An image pickup apparatus comprising:
an optical device; and
a photoelectric conversion element configured to receive an optical image formed via an optical system,
wherein the optical device includes:
the optical system including:
an aperture stop, a unit A, and a unit B disposed at an image side relative to the unit A,
a distortion operation unit, which is a ring or a button, configured to move the unit A and the unit B with loci different from each other in an optical direction for performing a distortion adjustment, a zooming operation unit, which is a ring or a button, configured to move a lens which moves in zooming for changing a focal length, and a focusing operation unit, which is a ring or a button, configured to move a lens which moves in focusing for changing a focus position, wherein:

the optical system changes an optical state from a first optical state having a first distortion to a second optical state having a second distortion larger than the first distortion by moving the unit A and the unit B, and the distortion operation unit, the zooming operation unit, the focusing operation unit are independently operable by a user.

* * * * *